United States Patent
Zhang et al.

(10) Patent No.: US 11,523,384 B2
(45) Date of Patent: Dec. 6, 2022

(54) RESOURCE ALLOCATION METHOD AND APPARATUS FOR BACKHAUL LINK AND ACCESS LINK

(71) Applicant: ZTE CORPORATION, Shenzhen (CN)

(72) Inventors: Shujuan Zhang, Shenzhen (CN); Feng Bi, Shenzhen (CN); Wenfeng Zhang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/050,806

(22) PCT Filed: Apr. 24, 2019

(86) PCT No.: PCT/CN2019/084035
§ 371 (c)(1),
(2) Date: Oct. 26, 2020

(87) PCT Pub. No.: WO2019/206171
PCT Pub. Date: Oct. 31, 2019

(65) Prior Publication Data
US 2021/0235428 A1    Jul. 29, 2021

(30) Foreign Application Priority Data
Apr. 26, 2018  (CN) .......... 201810386721.9

(51) Int. Cl.
*H04W 72/04*   (2009.01)
*H04L 5/00*    (2006.01)
*H04W 72/08*   (2009.01)

(52) U.S. Cl.
CPC ........ *H04W 72/044* (2013.01); *H04L 5/0048* (2013.01); *H04W 72/082* (2013.01)

(58) Field of Classification Search
CPC .... H04B 7/086; H04B 7/0617; H04B 7/0626; H04B 7/15542; H04W 72/044;
(Continued)

(56) References Cited

U.S. PATENT DOCUMENTS 9,088,988 B1    7/2015 Park et al.
2010/0118752 A1*    5/2010 Suzuki .............. H04W 52/0258
370/311
(Continued)

FOREIGN PATENT DOCUMENTS

CN    101779423 A    7/2010
CN    103813388 A    5/2014

OTHER PUBLICATIONS

International Search Report for Application No. PCT/CN2019/084035, dated Jul. 29, 2019, 6 pages.
(Continued)

*Primary Examiner* — Ian N Moore
*Assistant Examiner* — Sun Jong Kim
(74) *Attorney, Agent, or Firm* — Morgan, Lewis & Bockius LLP

(57) ABSTRACT

Provided are a resource allocation method, a measurement method, a frequency domain resource determination method, a transmission method, and corresponding apparatuses and devices and a storage medium. The resource allocation method includes: sending by a first communication node, resource request information to a second communication node, where the resource request information includes first information; and/or receiving, by the first communication node, first resource allocation information sent by the second communication node, where the first resource allocation information includes second information, the first information and/or the second information includes information of a resource occupiable by a channel
(Continued)

or signal between the first communication node and the second communication node and/or includes information of a resource occupiable by a channel or signal between the first communication node and one or more third communication nodes.

19 Claims, 5 Drawing Sheets

(58) Field of Classification Search
CPC ............ H04W 28/16; H04W 72/0426; H04W 72/082; H04W 88/04; H04W 72/1278; H04L 5/0044; H04L 5/0048
See application file for complete search history.

(56) References Cited

U.S. PATENT DOCUMENTS

| | | | | |
|---|---|---|---|---|
| 2012/0099520 A1* | 4/2012 | Kwon | ................... | H04B 7/155 370/315 |
| 2012/0201191 A1* | 8/2012 | Seo | ........................ | H04L 25/24 370/315 |
| 2016/0227548 A1* | 8/2016 | Nimbalker | ............ | H04L 5/0048 |
| 2018/0042031 A1* | 2/2018 | Hampel | ................ | H04W 72/12 |
| 2018/0317241 A1* | 11/2018 | Xia | ........................ | H04W 72/12 |
| 2019/0013908 A1* | 1/2019 | Xiong | ................... | H04L 5/0055 |
| 2019/0053265 A1* | 2/2019 | Kim | ........................ | H04L 5/001 |
| 2019/0165851 A1* | 5/2019 | Tiirola | ................... | H04B 7/155 |
| 2019/0246453 A1* | 8/2019 | Sano | ..................... | H04W 28/06 |
| 2020/0067687 A1* | 2/2020 | Qin | ................... | H04W 72/0406 |
| 2020/0106591 A1* | 4/2020 | Chen | ................ | H04W 72/1268 |
| 2020/0252180 A1* | 8/2020 | Takeda | ................ | H04W 72/042 |

OTHER PUBLICATIONS

Huawei et al., "Evaluation on the dynamic and flexible resource allocation in IAB", 3GPP Draft; R1-1801403, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26-2018-Mar. 2, 2018 Feb. 17, 2018 (Feb. 17, 2018), XP051397543, Retrieved from the Internet: URL:http://www.3gpp.org/ftp/tsg%5Fran/WG1%5FRL1/TSGR1%592/Docs/[retrieved on Feb. 17, 2018].
Partial Supplementary European Search Report for Application No. 19792659.5, dated Dec. 15, 2021, 16 pages.
Extended European Search Report for Application No. 19792659.5, dated Mar. 18, 2022, 13 pages.

* cited by examiner

RESOURCE ALLOCATION METHOD AND APPARATUS FOR BACKHAUL LINK AND ACCESS LINK

CROSS-REFERENCES TO RELATED APPLICATION

This is a National stage application, filed under 37 U.S.C. 371, of International Patent Application No. PCT/CN2019/084035, filed on Apr. 24, 2019, which the present application is based on and claims priority to a Chinese patent application No. 201810386721.9 filed on Apr. 26, 2018, disclosures of which are incorporated herein by reference in their entireties.

TECHNICAL FIELD

The present disclosure relates to the field of communications, and in particular, to a resource allocation method, a measurement method, a method for determining a frequency domain resource, a transmission method, and a corresponding apparatus and device, and a storage medium.

BACKGROUND

Backhaul (link between a base station and a base station controller) transmission based on an air interface can bring more flexibility to the network deployment of operators, because it is not required for optical fiber connection between base stations.

When the Backhaul is transmitted based on the air interface, a Relay node needs to perform backhaul communication with a gNB (5G base station) or an upper lever relay node on one hand, and needs to coordinate resources between a Backhaul link and an Access link to serve UEs (user equipments) covered by the Relay node or a lower level relay node, as shown in FIG. 1, a communication link between gNB/Relay1 and Relay2 is referred to as the Backhaul link, and a communication link between Relay2 and UE/Relay3 is referred to as the Access link, where channels/signals on the Backhaul link are scheduled by the gNB/Relay1 and channels/signals on the Access link is scheduled by Relay2.

When the Backhaul is transmitted based on an air interface, resources occupied by the Backhaul link and the Access link need to be coordinated, so that interference between the two links is minimized; especially, when two links communicate based on the NR (5G radio Access technology) communication standard, an effective solution has not been proposed at present for how to coordinate resources occupied by the Backhaul link and the Access link and how to reduce interference between the two links.

SUMMARY

In order to overcome the above drawbacks, a technical problem to be solved in the present disclosure is to provide a resource allocation method, a measurement method, a frequency domain resource determination method, a transmission method, and corresponding apparatuses and devices and a storage medium, which are used to at least solve the interference problem between the Backhaul link and the Access link.

To solve the above technical problem, an embodiment of the present disclosure provides a resource allocation method. The method includes steps described below.

A first communication node sends resource request information to a second communication node, where the resource request information includes first information; and/or
the first communication node receives first resource allocation information sent by the second communication node, where the first resource allocation information includes second information;
the first information and/or the second information includes information of a resource occupiable by a channel or signal between the first communication node and the second communication node and/or includes information of a resource occupiable by a channel or signal between the first communication node and one or more third communication nodes.

In order to solve the above technical problem, an embodiment of the present disclosure provides a resource allocation device. The device includes a memory and a processor, where the memory stores a computer program, and the processor executes the computer program to implement steps of the method described above.

To solve the above technical problem, an embodiment of the present disclosure provides a resource allocation method. The method includes steps described below.

A second communication node receives resource request information sent by a first communication node, where the resource request information includes first information; and/or
the second communication node sends resource allocation information to the first communication node, where the resource allocation information includes second information;
the first information and/or the second information includes information of a resource occupiable by a channel or signal between the first communication node and the second communication node, and/or includes information of a resource occupiable by a channel or signal between the first communication node and one or more third communication nodes.

In order to solve the above technical problem, an embodiment of the present disclosure provides a resource allocation device. The device includes a memory and a processor, where the memory stores a computer program, and the processor executes the computer program to implement steps of the method described above.

To solve the above technical problem, an embodiment of the present disclosure provides a measurement method. The method includes steps described below.

A first communication node receives first signaling information sent by a second communication node, where the first signaling information includes scheduling information of a measurement reference signal; the first communication node sends the measurement reference signal to the second communication node; and the first communication node receives channel state information corresponding to the measurement reference signal sent by the second communication node.

In order to solve the above technical problem, an embodiment of the present disclosure provides a measurement device. The device includes a memory and a processor, where the memory stores a computer program, and the processor executes the computer program to implement steps of the method described above.

To solve the above technical problem, an embodiment of the present disclosure provides a measurement method. The method includes steps described below.

The second communication node sends first signaling information, where the first signaling information is used for instructing the first communication node to send a reference signal;

the second communication node determines a spatial domain resource in the resource allocation information and/or channel state information according to a reference signal sent by the first communication node; and
the second communication node sends the channel state information to the first communication node.

In order to solve the above technical problem, an embodiment of the present disclosure provides a measurement device. The device includes a memory and a processor, where the memory stores a computer program, and the processor executes the computer program to implement steps of the method described above.

To solve the above technical problem, an embodiment of the present disclosure provides a method for determining a frequency domain resource. The method includes steps described below.

A resource occupiable by a channel or signal is determined by at least one of:
determining a frequency domain resource included in a bandwidth part (BWP) according to a time domain resource;
determining an available BWP set according to the time domain resource; or
determining a frequency domain resource occupiable by the channel or signal in one BWP according to the time domain resource.

In order to solve the above technical problem, an embodiment of the present disclosure provides a device for determining a frequency domain resource. The device includes a memory and a processor, where the memory stores a computer program, and the processor executes the computer program to implement steps of the method described above.

To solve the above technical problem, an embodiment of the present disclosure provides a method for transmitting a channel or a signal. The method includes steps described below.

A multiplexing manner set usable between a control channel in a first link and a control channel in a second link is a subset of a multiplexing manner set usable between a first channel or signal and a second channel or signal; the first link is a communication link between a first communication node and a second communication node, and the second link is a communication link between the first communication node and one or more third communication nodes; the first channel or signal is another channel or signal in the first link; the second channel or signal is another channel or signal in the second link; the another channel or signal is any one channel or signal other than the control channel.

In order to solve the above technical problem, an embodiment of the present disclosure provides a device for transmitting a channel or signal. The device includes a memory and a processor, where the memory stores a computer program, and the processor executes the computer program to implement steps of the method described above.

To solve the above technical problem, an embodiment of the present disclosure provides a resource allocation apparatus, which includes a sending module and/or a receiving module;
the sending module is configured to send resource request information to a second communication node, where the resource request information includes first information; and/or
the receiving module is configured to receive first resource allocation information sent by the second communication node, where the first resource allocation information includes second information;
the first information and/or the second information includes information of a resource occupiable by a channel a signal between a first communication node and the second communication node and/or includes information of a resource occupiable by a channel or signal between the first communication node and one or more third communication nodes.

To solve the above technical problem, an embodiment of the present disclosure provides a resource allocation apparatus, which includes a receiving unit and/or a sending unit;
the receiving unit is configured to receive resource request information sent by a first communication node, where the resource request information includes first information;
the sending unit is configured to send resource allocation information to the first communication node, where the resource allocation information includes second information;
the first information and/or the second information includes information of a resource occupiable by a channel or signal between the first communication node and the second communication node, and/or includes information of a resource occupiable by a channel or signal between the first communication node and one or more third communication nodes.

To solve the above technical problem, an embodiment of the present disclosure provides a measurement apparatus. The apparatus includes a signaling receiving module, a signaling sending module, and an information receiving module.

The signaling receiving module is configured to receive first signaling information sent by a second communication node, where the first signaling information includes scheduling information of a measurement reference signal;
the signaling sending module is configured to send a measurement reference signal to the second communication node; and
the information receiving module configured to receive channel state information corresponding to the measurement reference signal, where the channel state information is sent by the second communication node.

To solve the above technical problem, an embodiment of the present disclosure provides a measurement apparatus. The apparatus includes a signaling sending module, an information determining unit, an information sending module.

The signaling sending module is configured to send first signaling information, where the first signaling information is used for instructing a first communication node to send a reference signal;
the information determining unit is configured to determine a spatial domain resource in resource allocation information and/or channel state information according to the reference signal sent by the first communication node; and
the information sending module, which is configured to send the channel state information to the first communication node.

To solve the above technical problem, an embodiment of the present disclosure provides an apparatus for determining a frequency domain resource. The apparatus includes a determining module.

The determining module is configured to determine a resource occupiable by a channel or signal by at least one of:
determining a frequency domain resource included in a bandwidth part (BWP) according to a time domain resource;
determining an available BWP set according to the time domain resource; or
determining a frequency domain resource occupiable by the channel or signal in one BWP according to the time domain resource.

To solve the above technical problem, an embodiment of the present disclosure provides an apparatus for transmitting. The apparatus includes a determining unit, and a transmission unit.

The determining unit is configured to determine a multiplexing manner set usable by two channels or signals; the transmission unit is configured to transmit the two channels or signals by one multiplexing manner in the multiplexing manner set;
a multiplexing manner set usable between a first channel or signal and a second channel or signal is a subset of a multiplexing manner set usable between a third channel or signal and a fourth channel or signal;
the first channel or signal and the third channel or signal are channels or signals between a first communication node and a second communication node, and the second channel or signal and the fourth channel or signal are channels or signals between the first communication node and one or more third communication nodes.

To solve the above technical problem, an embodiment of the present disclosure provides a computer-readable storage medium, where the storage medium stores a first computer program, and/or a second computer program, and/or a third computer program, and/or a fourth computer program, and/or a fifth computer program, and/or a sixth computer program.

The first computer program, when executed by at least one processor, implements steps described below. A first communication node sends resource request information to a second communication node, where the resource request information includes first information; and/or
the first communication node receives first resource allocation information sent by the second communication node, where the first resource allocation information includes second information;
the first information and/or the second information includes information of a resource occupiable by a channel a signal between a first communication node and the second communication node and/or includes information of a resource occupiable by a channel or signal between the first communication node and one or more third communication nodes.

The second computer program, when executed by at least one processor, implements steps described below. A second communication node receives resource request information sent by a first communication node, where the resource request information includes first information; and/or
the second communication node sends resource allocation information to the first communication node, where the resource allocation information includes second information;
the first information and/or the second information includes information of a resource occupiable by a channel or signal between the first communication node and the second communication node, and/or includes information of a resource occupiable by a channel or signal between the first communication node and one or more third communication nodes.

The third computer program, when executed by at least one processor, implements steps described below. The first communication node receives first signaling information sent by the second communication node, where the first signaling information includes scheduling information of a measurement reference signal;
the first communication node sends the measurement reference signal to the second communication node; and
the first communication node receives channel state information corresponding to the measurement reference signal sent by the second communication node.

The fourth computer program, when executed by at least one processor, implements steps described below. The second communication node sends first signaling information, where the first signaling information is used for instructing a first communication node to send a reference signal;
the second communication node determines a spatial domain resource in the resource allocation information and/or channel state information according to a reference signal sent by the first communication node; and
the second communication node sends the channel state information to the first communication node.

The fifth computer program, when executed by at least one processor, implements steps described below. A resource occupiable by a channel or signal is determined by at least one of:
determining a frequency domain resource included in a bandwidth part (BWP) according to a time domain resource; determining an available BWP set according to the time domain resource; or
determining a frequency domain resource occupiable by the channel or signal in one BWP according to the time domain resource.

The sixth computer program, when executed by at least one processor, implements steps described below. A multiplexing manner set usable by two channels or signals is determined;
the two channels or signals are transmitted by one multiplexing manner in the multiplexing manner set;
a multiplexing manner set usable between a first channel or signal and a second channel or signal is a subset of a multiplexing manner set usable between a third channel or signal and a fourth channel or signal;
the first channel or signal and the third channel or signal are channels or signals between a first communication node and a second communication node, and the second channel or signal and the fourth channel or signal are channels or signals between the first communication node and one or more third communication nodes.

The present disclosure can achieve beneficial effects described below.

The embodiments of the present disclosure implement resource coordination between the first communication node and the second communication node, and ensure orthogonality between reference signals and/or control channels during spatial division multiplexing between the Backhaul link and the Access link, thereby enabling the Relay node to effectively process channels or signals of the Backhaul link and channels or signals of the Access link, and thus the interference problem during spatial division multiplexing of the Backhaul link and the Access link is effectively solved.

DETAILED DESCRIPTION

Figure 1:
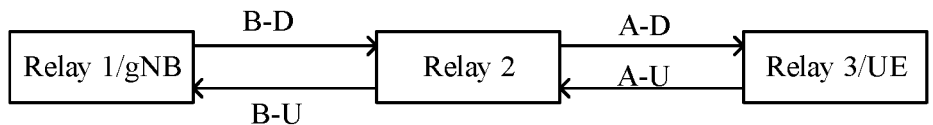
FIG. 1 is a schematic diagram of a Backhaul link and an Access link in the related art.

In order to solve the problems in the existing art, the present disclosure provides a resource allocation method, a measurement method, a method for determining a frequency domain resource, a transmission method, a corresponding apparatus and device, and a storage medium. The present disclosure will be explained in detail in conjunction with the drawings and embodiments. It is to be understood that specific embodiments described herein are intended to explain the present disclosure, and not to limit the present disclosure.

In the following description, suffixes such as "module", "component", or "unit" used to indicate elements are used only for facilitating the explanation of the present disclosure, and have no particular meaning in themselves. Thus, "module", "component" or "unit" may be used mixedly.

The use of prefixes, such as "first," "second," etc., to distinguish elements is merely to facilitate the description of the present disclosure, and is not intended to render a particular meaning in itself.

Embodiment One

An embodiment of the present disclosure provides a resource allocation method, including steps described below.

A first communication node sends resource request information to a second communication node, where the resource request information includes first information; and/or
the first communication node receives first resource allocation information sent by the second communication node, where the first resource allocation information includes second information;
the first information and/or the second information includes information of a resource occupiable by a channel a signal between a first communication node and the second communication node and/or includes information of a resource occupiable by a channel or signal between the first communication node and one or more third communication nodes.

The embodiments of the present disclosure implement resource coordination between the first communication node and the second communication node, and ensure orthogonality between reference signals and/or control channels during spatial division multiplexing between the Backhaul link and the Access link, thereby enabling the Relay node to effectively process channels or signals of the Backhaul link and channels or signals of the Access link, and thus an interference problem during spatial division multiplexing of the Backhaul link and the Access link is effectively solved.

In the embodiments of the present disclosure, the resource includes at least one of the following resources: a reference signal resource, a time domain resource, a frequency domain resource, a spatial domain resource, a code domain resource, or a control channel resource.

The reference signal includes at least one of the following signals: a demodulation reference signal, a phase tracking reference signal, or a measurement reference signal.

Optionally, the time domain resource includes at least one of pieces of following information:
a range of a number of time domain symbols occupiable by the channel or signal in one time unit, a time unit set occupiable by the channel or signal, the number of time domain symbols occupiable by the channel or signal in a time unit, a time domain symbol set occupied by the channel or signal in a time unit, or a subcarrier spacing corresponding to a time domain symbol where the channel or signal is located.

Optionally, information of the frequency domain resource includes at least one of pieces of following information:
bandwidth part (BWP) information, component carrier (CC) information, information of a physical resource block (PRB) set in a bandwidth part (BWP), or information of a subcarrier spacing corresponding to the frequency domain resource.

Optionally, the code domain resource information includes at least one of pieces of following information:
generation parameter information of a scrambling sequence of the channel, or sequence generation information of a reference signal.

Optionally, one spatial domain resource corresponds to one measurement reference signal resource; and/or one spatial domain resource corresponds to one port group of one measurement reference signal resource.

The channel or the signal includes at least one of the following channels or signals:
a channel or signal sent by the first communication node to the one or more third communication nodes, a channel or signal sent by the one or more third communication nodes to the first communication node, a channel or signal sent by the second communication node to the first communication node, or a channel or signal sent by the first communication node to the second communication node, where the channel includes at least one of the following channels: a data channel or a control channel.

In the embodiment of the present disclosure, optionally, the step in which the resource request information is sent to the second communication node includes steps described below.

The resource request information is sent to the second communication node in an uplink channel or an uplink signal.

In the embodiment of the present disclosure, optionally, the step in which the first resource allocation information sent by the second communication node is received includes steps described below.

The first resource allocation information sent by the second communication node is received in a downlink channel or a downlink signal.

In the embodiment of the present disclosure, optionally, the first information and/or the second information further includes following information:
multiplexing manner information usable between a first channel or signal and a second channel or signal, where the first channel or signal is a channel or signal between the first communication node and the second communication node, and the second channel or signal is a channel or signal between the first communication node and the one or more third communication nodes.

Optionally, the multiplexing manner information satisfies at least one of the following conditions:
a multiplexing manner set usable by a first control channel and a second control channel is a subset of a multiplexing manner set usable between a third channel or signal and a fourth channel or signal, where the first control channel is a control channel between the first communication node and the second communication node, and the second control channel is a control channel between the first communication node and the one or more third communication nodes; or
multiplexing manner set usable by a first reference signal and a second reference signal is a subset of a multiplexing manner set usable between the third channel or signal and the fourth channel or signal, where the first reference signal is a reference signal between the first communication node and the second communication node, and the second reference signal is a reference signal between the first communication node and the one or more third communication nodes.

The third channel or signal is another channel or signal between the first communication node and the second communication node, the fourth channel or signal is another channel or signal between the first communication node and the one or more third communication nodes, and the another channel or signal is any channel or signal other than the control channel and/or the reference signal.

Optionally, the multiplexing manner set usable by the first control channel and the second control channel is a first multiplexing manner set; the multiplexing manner set usable by the first reference signal and the second reference signal is a second multiplexing manner set; the multiplexing manner set usable by the third channel or signal and the fourth channel or signal is a third multiplexing manner set;
the first multiplexing manner set and/or the second multiplexing manner set does not include a spatial division multiplexing manner, and the third multiplexing manner set includes a spatial division multiplexing manner.

In the embodiment of the present disclosure, optionally, the method further includes at least one of:

the first communication node sends second resource allocation information to the one or more third communication nodes, where the second resource allocation information is used for indicating the information of the resource occupiable by the channel or signal between the first communication node and the one or more third communication nodes;
the first communication node communicates with the second communication node according to the first resource allocation information and/or the resource request information; or
the first communication node communicates with the one or more third communication nodes according to the first resource allocation information and/or the resource request information.

Optionally, the second resource allocation information satisfies at least one of the following conditions:
the second resource allocation information includes information of a control channel resource where a control channel sent by the first communication node and to be detected by the one or more third communication nodes is located, and an intersection between the control channel resource and a first resource is non-empty;
the second resource allocation information includes information of a data channel resource occupiable by a semi-persistent data channel that is sent by the first communication node to the one or more third communication nodes, and an intersection between the data channel resource and the first resource is non-empty;
an intersection between a resource indicated in the second resource allocation information and the first resource is non-empty;
the second resource allocation information includes physical layer dynamic allocation information, and the first resource allocation information includes high layer signaling information;
an intersection between the resource indicated in the second resource allocation information and a second resource is empty, and the second resource is a resource occupied by a reference signal between a first communication node and a second communication node included in the second information;
an intersection between the resource indicated in the second resource allocation information and a third resource is empty, and the third resource is a resource occupied by a control channel resource between the first communication node and the second communication node included in the second information; or
the first communication node communicates with the one or more third communication nodes according to the second resource allocation information and/or the first resource allocation information and/or the resource request information.

The first resource is a resource indicated by the information of the resource occupiable by the channel or signal between the first communication node and the second communication node, where the information of the resource is included in the second information.

Optionally, the first resource allocation information satisfies at least one of the following conditions:
the first resource allocation information includes a time domain resource list occupiable by the channel, and all time domain resources included in the time domain resource list have a same time domain resource mapping manner, where the time domain resource occupied by the channel can be obtained according to the received signaling information;
the first resource allocation information includes a time domain resource list occupiable by the channel, and a number of time domain symbols corresponding to all time domain resources included in the time domain resource list belongs to one predetermined set of numbers of time domain symbols;

the first resource allocation information includes a time domain resource list occupiable by the channel, and time domain symbols of demodulation reference signals corresponding to all time domain resources included in the time domain resource list satisfy an agreed condition;

the first resource allocation information is included in high layer signaling information;

an intersection between a resource included in the first resource allocation information and a resource occupied by the control channel resource is empty, where the control channel resource is included in the resource request information; or an intersection between a resource included in the first resource allocation information and a time-frequency resource occupied by the control channel resource included in the resource request information is empty; or an intersection between a time domain resource occupiable by the first channel or signal included in the first resource allocation information and a time domain resource occupiable by the second channel or signal included in the first resource allocation information is non-empty, where the first channel or signal is a channel or signal sent by the first communication node to the second communication node, and/or the first channel or signal is followed by a third channel or signal, and the second channel or signal is a channel or signal sent by the first communication node to the one or more third communication nodes, and the third channel or signal is a channel or signal received by the first communication node. Optionally, at this time, the first channel and/or signal and the first channel and/or signal are only time division multiplexed, not frequency-divided, nor space-divided at the first communication node.

Optionally, the one predetermined set of numbers of time domain symbols satisfies at least one of the following conditions:

the one predetermined set of numbers of time domain symbols is obtained according to an agreed rule;

time domain symbol positions of demodulation reference signals corresponding to all numbers of time domain symbols in the set of numbers of time domain symbols are the same, the time domain symbol positions are obtained according to high layer signaling configuration information of the demodulation reference signals;

the one predetermined set of numbers of time domain symbols is one of a plurality of predetermined sets of numbers of time domain symbols;

the one predetermined set of numbers of time domain symbols is one of a plurality of predetermined sets of numbers of time domain symbols, and the plurality of predetermined sets of numbers of time domain symbols are obtained according to high layer configuration information of the demodulation reference signals; or the one predetermined set of numbers of time domain symbols is one of a plurality of predetermined sets of numbers of time domain symbols, and the plurality of predetermined sets of numbers of time domain symbols are obtained according to a first parameter of the demodulation reference signal, and the first parameter includes at least one of the following parameters: a time domain resource mapping manner, a number of consecutive time domain symbol groups other than a first consecutive time domain symbol group that are occupied by the demodulation reference signal, or a number of time domain symbols included in the consecutive time domain symbol groups occupied by the demodulation reference signal.

In the embodiment of the present disclosure, optionally, the first communication node further obtains the second information according to an agreed rule, and the agreed rule satisfies at least one of the following conditions:

a demodulation reference signal between the first communication node and the second communication node and a demodulation reference signal between the first communication node and the one or more third communication nodes are only able to be in different demodulation reference signal code division multiplexing groups;

a time domain resource mapping manner corresponding to the channel are unable to be changed dynamically;

a number of time domain symbols included in a consecutive time domain symbol group occupied by a demodulation reference signal is unable to be dynamically changed;

a time domain symbol position occupied by the demodulation reference signal between the first communication node and the second communication node is unable to be dynamically changed; or a low peak-to-average ratio sequence is usable as a downlink reference signal sequence sent by the second communication node to the first communication node.

The methods in the embodiments of the present disclosure will be described in detail below by specific examples.

Example 1

Figure 2:
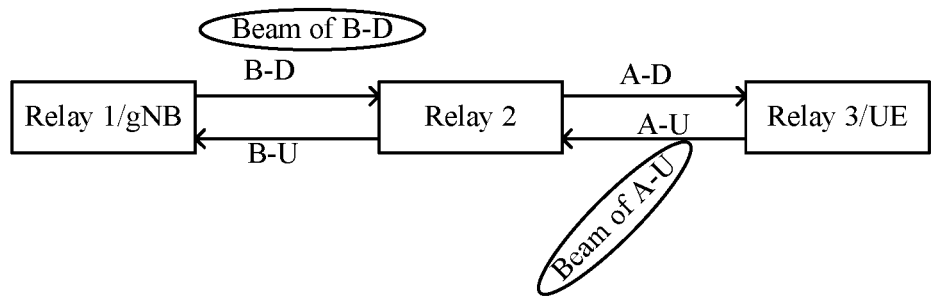
FIG. 2 is a schematic diagram of an SDM multiplexing manner for B-D links and A-U links according to an embodiment of the present disclosure.

For example, as shown in FIG. 2, the Relay2 (i.e., the first communication node) needs to perform Backhaul link communication with gNB/Relay1 (i.e., the second communication node) and needs to perform Access link communication with the Relay3. Scheduling authority of the Backhaul link is controlled by the gNB/Relay1, and scheduling authority of the Access link is controlled by the Relay2. A B-D link between the gNB/Relay1 and the Relay2 forms a Backhaul link, and an A-U link between the Relay2 and the UE/Relay3 forms an Access link. The Backhaul link and the Access link may also be referred to as a first link and a second link, or other example names. There are optical fiber connections between the gNB and the core network, and there is no optical fiber connection between the Relay1 and the core network. The Relay1 can only be connected to one gNB through one-hop or multi-hop wireless Backhaul. For simplicity of description, a communication link in the embodiments of the present disclosure may be referred to as a link for short, and a time domain and frequency domain resource may be referred to as a time-frequency resource for short.

In order for the Relay2 to be able to process signals on the two links, resources occupied by channels or signals on the two links need to be coordinated. The multiplexing manner on the two links has multiplexing scenarios shown in Table 1. In Table 1, TDM represents time division multiplexing, FDM represents frequency division multiplexing, SDM represents spatial division multiplexing, TDD represents time division duplexing, and FDD represents frequency division duplexing.

TABLE 1

| Multiplexing manner | Between B-D and A-D, or between B-U and A-U | Between B-D and A-U, or between B-U and A-D | Between B-D and B-U, or between A-U and A-D |
|---|---|---|---|
| Scenario 1 | TDM | TDM | TDD, FDD |
| Scenario 2 | TDM | FDM | TDD, FDDF |
| Scenario 3 | TDM | SDM | TDD, FDDF |

TABLE 1-continued

| Multiplexing manner | Between B-D and A-D, or between B-U and A-U | Between B-D and A-U, or between B-U and A-D | Between B-D and B-U, or between A-U and A-D |
|---|---|---|---|
| Scenario 4 | FDM | TDM | TDD, FDDF |
| Scenario 5 | FDM | FDM | TDD, FDDF |
| Scenario 6 | FDM | SDM | TDD, FDDF |
| Scenario 7 | SDM | TDM | TDD, FDDF |
| Scenario 8 | SDM | FDM | TDD, FDDF |
| Scenario 9 | SDM | SDM | TDD, FDDF |

Two links of TDM need to coordinate time domain resources, two links of FDM need to coordinate frequency domain resources, and two links of SDM need to coordinate spatial domain resources, code domain resources, reference signal resources, etc. In the following, taking the link coordination between A-U and B-D as an example, the resource coordination manner includes the following two manners:

Manner 1:

The resource allocation method based on this manner includes steps described below.

In step 11, the Relay2 sends resource request information to the gNB/Relay 1.

In this example, optionally, the information of the resource occupiable by the channel or signal between the first communication node and the second communication node includes at least one of pieces of following information:

on the resource, the first communication node is unable to receive a channel and/or a signal sent by the second communication node, where the resource is an occupiable resource;

on the resource, the first communication node is unable to send a channel and/or a signal to the second communication node;

outside the resource, the first communication node is able to receive a channel and/or a signal sent by the second communication node; or outside the resource, the first communication node is able to send a channel and/or a signal to the second communication node; and, the information of the resource occupiable by the channel or signal between the first communication node and the one or more third communication nodes includes at least one of pieces of following information:

on the resource, the first communication node receives a channel and/or a signal sent by the one or more third communication nodes;

on the resource, the first communication node sends a channel and/or a signal to the one or more third communication nodes;

outside the resource, the first communication node is unable to receive a channel and/or a signal sent by the one or more third communication nodes; or outside the resource, the first communication node is unable to send a channel and/or a signal to the one or more third communication nodes.

In this example, optionally, the information of the resource occupiable by the channel or signal between the first communication node and the second communication node includes at least one of pieces of following information:

on the resource, the first communication node is able to receive a channel and/or a signal sent by the second communication node;

on the resource, the first communication node is able to send a channel and/or a signal to the second communication node;

outside the resource, the first communication node does not receive a channel and/or a signal sent by the second communication node; or outside the resource, the first communication node does not send a channel and/or a signal to the second communication node; and, the information of the resource occupiable by the channel or signal between the first communication node and the one or more third communication nodes includes at least one of pieces of following information:

on the resource, the first communication node is unable to receive a channel and/or a signal sent by the one or more third communication nodes;

on the resource, the first communication node is unable to send a channel and/or a signal to the one or more third communication nodes;

outside the resource, the first communication node is able to receive a channel and/or a signal sent by the one or more third communication nodes; or on the resource, the first communication node is able to send a channel and/or a signal to the one or more third communication nodes.

That is, the resource request information is used for indicating at least one of pieces of following information: a demodulation reference signal resource occupied by the A-U link; a demodulation reference signal resource unoccupiable by the B-D link; the B-D link can only occupy a demodulation reference signal resource other than a demodulation reference signal resource included in the resource request information; the A-U cannot occupy a demodulation reference signal resource other than a demodulation reference signal resource included in the resource request information; or the resource request information is used for indicating at least one of pieces of following information: a demodulation reference signal resource occupiable by the B-D link; a demodulation reference signal resource unoccupiable by the A-U link; the B-D link cannot occupy the demodulation reference signal resource other than the resource request information;

the A-U link can occupy the demodulation reference resource other than the demodulation signal resource included in the resource request information.

In step 12, the gNB/Relay1 sends first resource allocation information to the Relay2 according to the resource request information sent by the Relay2 and in combination with the service condition of the UE/Relay2 covered by the gNB/Relay 1.

In step 13, the Relay2 receives first resource allocation information, and sends, according to the first resource allocation information and communications between the gNB/Relay2 or according to the first resource allocation information, second resource allocation information to the Relay3/UE covered by the Relay2 for scheduling/allocating resources occupied by the channels or signals between the Relay2 and Relay3/UE covered by the Relay2.

Manner 2:

The resource allocation method based on this manner includes steps described below.

In step 21, the gNB/Relay1 directly sends the first resource allocation information to the Relay 2.

In step 22, the Relay2 receives the first resource allocation information, and schedules/allocates resources occupied by the signal between the Relay2 and Relay3/UE covered by the Relay 2 according to the first resource allocation information and communications between the gNB/Relay2 or according to the first resource allocation information.

In the manner 1 and the manner 2, the first resource allocation information sent by the gNB/Relay1 to the Relay2 is used for indicating at least one of pieces of following information: a demodulation reference signal resource occupied by the A-U link; a demodulation reference signal resource unoccuipable by the B-D link; the B-D link can only occupy a demodulation reference signal resource other than a demodulation reference signal resource included in the resource request information; the A-U cannot occupy a demodulation reference signal resource other than a demodulation reference signal resource included in the resource request information; or the resource request information is used for indicating at least one of pieces of following information: a demodulation reference signal resource occupiable by the B-D link; a demodulation reference signal resource unoccuipable by the A-U link; the B-D link cannot occupy the demodulation reference signal resource other than the resource request information; the A-U link can occupy the demodulation reference resource other than the demodulation signal resource included in the resource request information.

The resource includes at least one of the following resources: a reference signal resource, a time domain resource, a frequency domain resource, a spatial domain resource, a code domain resource, or a control channel resource.

The reference signal includes at least one of the following signals: a demodulation reference signal, a phase tracking reference signal, or a measurement reference signal.

In the embodiments of the present disclosure, resource allocation can also be described as resource coordination. The above two manners take resource coordination between the A-U link and the B-D link as examples, and similarly, may be used for resource coordination between the A-D link and the B-U link, resource coordination between the A-D link and the B-D link, resource coordination between A-U link and the B-U link, as well as resource coordination between the A link and the B link, where the A link includes the A-D link and the B-U link, and the B link includes the B-U link and the A-D link.

When two links are frequency division multiplexed, frequency domain resources occupied by the two links need to be coordinated. Different links may occupy different component carriers (CCs), or different links occupy different bandwidth parts (BWPs) under one CC, or different links occupy different sets of physical resource blocks (PRBs) under one BWP. That is, the frequency domain resource request information and/or the first frequency domain resource allocation information includes at least one of pieces of following information: a CC, a BWP, or a set of PRBs in the BWP. In the case of a BWP/PRB set, an agreement is required between the gNB/Relay1 and the Relay2, that is, no overlap between the frequency domain resources occupied by the Backhaul link and the Access link.

Optionally, the first resource allocation information is included in high layer signaling, for example, in a case where resources occupiable by the B-U are allocated in the first resource allocation information, the resources actually occupied by the channel or signal in B-U among the available resources allocated by high layer signaling are allocated by physical layer control channel and/or the high layer signaling.

When the two links are spatial division multiplexed, code domain resources occupied by the two links, such as scrambling sequence resources of the channels, can be coordinated so that scrambling sequences of the two links are different. For example, Relay2 sends resource request information to gNB/Relay1, and/or gNB/Relay1 sends the first resource allocation information to Relay2, where the resource request information and/or the first resource allocation information includes a generation parameter of a scrambling sequence, such as information scrambling sequence generation parameters of a physical uplink shared channel (PUSCH) in standard 38.211, that is $n_{ID}$ and/or $n_{RNTI}$ as shown in formula (1-1), and/or generation parameters of scrambling sequences of PDSCH, that is $n_{ID}$ and/or $n_{RNTI}$ as shown in formula (1-2). In particular, the generation parameters of the scrambling sequences of the PDSCH of a transmission broadcast message or a group message on the two links need to be coordinated.

$$c_{init}=n_{RNTI} \cdot 2^{15}+n_{ID} \qquad (1\text{-}1)$$

$$c_{init}=n_{RNTI} \cdot 2^{15}+q \cdot 2^{14}+n_{ID} \qquad (1\text{-}2)$$

Example 2

When the two links are spatial division multiplexed, it means that the time frequency resources occupied by the two links are overlapped, or the two links can be independently scheduled in the same time frequency resource set, and are distinguished by different beams. When the two links are spatial division multiplexed, the interference problem of the two links between the reference signals and/or the control channels needs to be considered, that is, the multiplexing manner between the reference signals on the two links is a subset of the multiplexing manner of other channels or signals, and/or the multiplexing manner between the control channels on the two links is a subset of the multiplexing manner of other channels or signals, where the other channels or signals are channels or signals other than the reference signals and/or the control channel resources.

For example, the data channels of the two links may be spatial division multiplexed, however, due to the difference between the channels in the measurement and actual transmission stages and the interference of side lobes, the orthogonality between the demodulation reference signals of the two links needs to be ensured, and thus, the performance of the two links can be ensured on the basis that time-frequency resources occupied by the data channels of the two links are overlapped.

In this example, the combination of the two links includes at least one of the following combinations: B-D and A-D, B-D and A-U, B-D and A-U, B-U and A-D, a B link or an A link, where the A link includes A-D and B-U, and the B link includes B-U and A-D.

Before describing the demodulation reference signal resource information, a demodulation reference signal pattern in NR will be described firstly.

A demodulation reference signal of a Physical Downlink Shared Channel (PDSCH) in NR, or when transforming precoding is not enabled, a demodulation reference signal pattern of the PUSCH includes Configuration type 1 and Configuration type2, hereinafter, taking the PDSCH as an example, a pattern of a Demodulation Reference Signal (DMRS) is as shown in formula (1):

$$a_{k,l}^{(p,\mu)} = \beta_{PDSCH}^{DMRS} w_f(k')w_t(l')r(2n+k')$$

-continued $$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Figure 3:
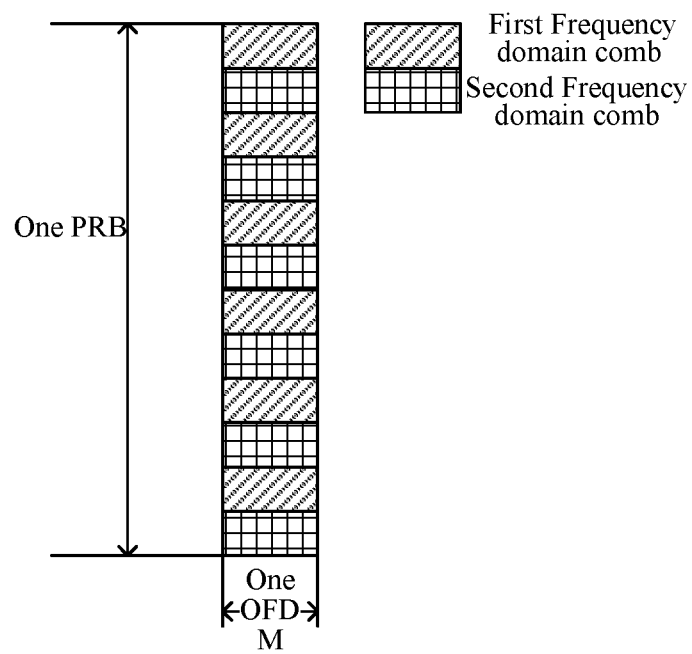
FIG. 3 is a pattern diagram of a pattern type one of a DMRS according to an embodiment of the present disclosure.

$\beta_{PDSCH}^{DMRS}$ represents a power difference between the DMRS and the PDSCH, $w_f^{(k')}$ is an element in a port frequency domain orthogonalization vector, $w_t(l')$ is an element in a port time domain orthogonalization vector. In the case where the DMRS pattern type is Configuration type 1, $\Delta$ is a frequency domain comb index, as shown in FIG. 3, a DMRS port occupies all REs in a frequency domain comb and is only in one frequency domain comb. Different ports in a frequency domain comb can be multiplexed by the code division multiplexing manner, therefore, a frequency domain comb can also be called as a code division multiplex (CDM) group. In the case where the DMRS pattern type is Configuration type 2, $\Delta$ is an index for frequency domain groups. A DMRS port occupies all REs in a frequency domain group and is only in one frequency domain. Different ports in a frequency domain group are multiplexed by the code division multiplexing manner, therefore, a frequency domain group can also be called as a CDM group. A corresponding relationship between port numbers and, $w_f(k')$, $w_t(l')$ and $\Delta$ in the Configuration type 1 is as shown in Table 2, and a corresponding relationship between port numbers and, $w_f(k')$, $w_t(l')$ and $\Delta$ in the Configuration type 2 is as shown in Table 3.

$a_{k,l}^{p,\mu}$ is a demodulation reference signal symbol of port p on a k-th subcarrier and a l-th time domain symbol, u is a subcarrier spacing parameter of a time domain symbol where the demodulation reference signal is located. In a case where a time domain resource mapping manner of the PDSCH is configured as a mapping type A, l is a time domain symbol index relative to a starting time domain symbol of the PDSCH. In a case where the time domain resource mapping manner of the PDSCH is configured as a mapping type B, l is a time domain symbol index relative to the starting time domain symbol of the PDSCH; $\bar{l}$ is a starting time domain symbol index in one group of consecutive time domain symbols occupied by the DMRS. In a case where only one time domain symbol exists in one group of consecutive time domain symbols occupied by the DMRS, $\bar{l}$ is obtained according to Table 4; and in a case where two time domain symbols exist in one group of consecutive time domain symbols occupied by the DMRS, $\bar{l}$ is obtained according to Table 5. l' is used for indicating a local index in one group of consecutive time domain symbols occupied by the DMRS. r(2n+k') is obtained according to formula (2):

$$r(n) = \frac{1}{\sqrt{2}}(1 - 2 \cdot c(2n)) + j\frac{1}{\sqrt{2}}(1 - 2 \cdot c(2n + 1)) \quad (2)$$

In formula (2), $c(n_1)$ is a $n_1$-th value in a PN sequence corresponding to the demodulation reference signal, and an initial value of the PN sequence is obtained by formula (3):

$$c_{init} = (2^{17}(14n_{s,f}^\mu + l + 1)(2N_{ID}^{nSCID} + 1) + 2N_{ID}^{nSCID}) \bmod 2^{31} \quad (3)$$

$n_{s,f}^\mu$ is a slot index in a radio frame f of a slot obtained according to the parameter $\mu$ of the subcarrier spacing, and $N_{ID}^{nSCID}$ is a virtual cell number or cell ID configured by the high layer signaling.

TABLE 2

Corresponding relationship between port numbers and $w_f(k')$, $w_t(l')$, $\Delta$ in the Configuration type 1:

| p (Port number) | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 3

Corresponding relationship between port numbers and, , Δ in the Configuration type 2:

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A value of $\bar{l}$ when the consecutive time domain symbol occupied by the DMRS is 1 is shown in Table 4:

TABLE 4

| Duration in symbols (Numbers of time domain symbols) | DM-RS positions $\bar{l}$ | | | | | | |
|---|---|---|---|---|---|---|---|
| | PDSCH mapping type A DL-DMRS-add-pos | | | | PDSCH mapping type B DL-DMRS-add-pos | | |
| | 0 | 1 | 2 | 3 | 0 | 1 | 2  3 |
| 2 | — | — | — | — | $l_0$ | $l_0$ | |
| 3 | $l_0$ | $l_0$ | $l_0$ | $l_0$ | — | — | |
| 4 | $l_0$ | $l_0$ | $l_0$ | $l_0$ | $l_0$ | $l_0$ | |
| 5 | $l_0$ | $l_0$ | $l_0$ | $l_0$ | — | — | |
| 6 | $l_0$ | $l_0$ | $l_0$ | $l_0$ | — | — | |
| 7 | $l_0$ | $l_0$ | $l_0$ | $l_0$ | $l_0$ | $l_0$,4 | |
| 8 | $l_0$ | $l_0$, [7] | $l_0$, [7] | $l_0$, [7] | — | — | |
| 9 | $l_0$ | $l_0$, 7 | $l_0$, 7 | $l_0$, 7 | — | — | |
| 10 | $l_0$ | $l_0$, 9 | $l_0$, 6, 9 | $l_0$, 6, 9 | — | — | |
| 11 | $l_0$ | $l_0$, 9 | $l_0$, 6, 9 | $l_0$, 6, 9 | — | — | |
| 12 | $l_0$ | $l_0$ 9 | $l_0$, 6, 9 | $l_0$, 5, 8, 11 | — | — | |
| 13 | $l_0$ | $l_0$, 11 | $l_0$, 7, 11 | $l_0$, 5, 8, 11 | — | — | |
| 14 | $l_0$ | $l_0$, 11 | $l_0$, 7, 11 | $l_0$, 5, 8, 11 | — | — | |

A value of $\bar{l}$ when the consecutive time domain symbol occupied by the DMRS is 2 is shown in Table 5:

TABLE 5

| | DM-RS positions $\bar{l}$ | | | | | |
|---|---|---|---|---|---|---|
| | PDSCH mapping type A DL-DMRS-add-pos | | | PDSCH mapping type B DL-DMRS-add-pos | | |
| Duration in symbols | 0 | 1 | 2 | 0 | 1 | 2 |
| <4 | | | | — | — | |
| 4 | $l_0$ | $l_0$ | | — | — | |
| 5 | $l_0$ | $l_0$ | | — | — | |
| 6 | $l_0$ | $l_0$ | | — | — | |
| 7 | $l_0$ | $l_0$ | | 10 | 10 | |
| 8 | $l_0$ | $l_0$ | | — | — | |
| 9 | $l_0$ | $l_0$ | | — | — | |
| 10 | $l_0$ | $l_0$, 8 | | — | — | |
| 11 | $l_0$ | $l_0$, 8 | | — | — | |
| 12 | $l_0$ | $l_0$, 8 | | — | — | |
| 13 | $l_0$ | $l_0$, 10 | | — | — | |
| 14 | $l_0$ | $l_0$, 10 | | — | — | |

$l'$ in formula (1) is obtained through Table 6:

TABLE 6

| Single or double symbol DM-RS | $l'$ | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

The above is taking the demodulation reference signal of the PDSCH as an example. In the case where the transforming precoding is disabled for the PUSCH, that is, the PUSCH uses Cyclic Prefix-Orthogonal Frequency Division Multiplexing (CP-OFDM) transmission, a pattern of a demodulation reference signal of the PUSCH is the same as the pattern of the demodulation reference signal of the PDSCH and will not be repeated here.

In a case where the transforming precoding of the PUSCH is enabled, that is, the PUSCH uses Single-carrier Frequency-Division Multiple Access (SC-FDMA) transmission, the demodulation reference signal of the PUSCH uses the pattern of the configuration type 1, and r(2n+k') uses a ZC sequence.

The following takes the coordination between the demodulation reference signals of the B-D link and the A-U link as an example to describe the resource allocation method of the demodulation reference signals between the two links, which can be similarly used for resource allocation of other two links mentioned above. This example also includes two manners.

Manner 1:

In step 31, the Relay2 sends resource request information to the gNB/Relay1, the resource request information is used for requesting first information.

In step 32, the gNB/Relay1 sends first resource allocation information to the Relay2 according to the resource request information sent by the Relay2 and in combination with the service condition of the UE/Relay2 covered by the gNB/Relay 1.

In step 33, the Relay2 receives first resource allocation information, and sends, according to the first resource allocation information and communications between the gNB/Relay2 or according to the first resource allocation information, second resource allocation information to the Relay3/UE covered by the Relay2 for scheduling/allocating resources occupied by the channels or signals between the Relay2 and Relay3/UE covered by the Relay2.

Manner 2:

In step 41, the gNB/Relay1 directly sends the first resource allocation information to the Relay 2.

In step 42, the Relay2 receives first resource allocation information, and sends, according to the first resource allocation information and communications between the gNB/Relay2 or according to the first resource allocation information, second resource allocation information to the Relay3/UE covered by the Relay2 for scheduling/allocating resources occupied by the channels or signals between the Relay2 and Relay3/UE covered by the Relay2.

In the manner 1 and the manner 2, the first resource allocation information sent by the gNB/Relay1 to Relay2 is used for indicating the second information.

The first information is used for requesting at least one of pieces of following information and/or the second information is used for indicating at least one of pieces of following information: a demodulation reference signal resource occupiable by the A-U; a demodulation reference signal resource unoccupiable by a demodulation reference signal of the B-D; a channel or signal of the B-D cannot occupy a time frequency resource occupied by a demodulation reference signal occupiable by the A-U; the demodulation reference signal of the B-D can only occupy reference signals other than the demodulation reference signal included in the resource request information; the channel or signal of the B-D can only occupy time frequency resources other than the time frequency resources occupied by the demodulation reference signal resource included in the resource request information; or, the demodulation reference signal of the A-U cannot occupy demodulation reference signal resources other than the demodulation reference signal resources included in the resource request information.

Alternatively, the first information is used for requesting at least one of pieces of following information and/or the second information is used for indicating at least one of pieces of following information: a demodulation reference signal resource occupiable by the B-D; a demodulation reference signal resource unoccupiable by a demodulation reference signal of the A-U; a channel or signal of the A-U cannot occupy a time frequency resource occupied by a demodulation reference signal occupiable by the B-D; the demodulation reference signal of the A-U can only occupy reference signals other than the demodulation reference signal included in the resource request information; the channel or signal of the A-U can only occupy time frequency resources other than the time frequency resources occupied by the demodulation reference signal resource included in the resource request information; or, the demodulation reference signal of the B-D cannot occupy demodulation reference signal resources other than the demodulation reference signal resources included in the resource request information.

The first information and/or the second information may include the above-mentioned multiple pieces of information, one manner is that the first information and/or the second information includes a configuration value of each piece of information among the above-mentioned multiple pieces of information, and the other manner is that the first information and/or the second information includes configuration values of a limited number of pieces of information among the above-mentioned multiple pieces of information, and configuration values of other information can be obtained according to the configured information, or one configuration value corresponds to the above-mentioned multiple pieces of information.

Figure 4:
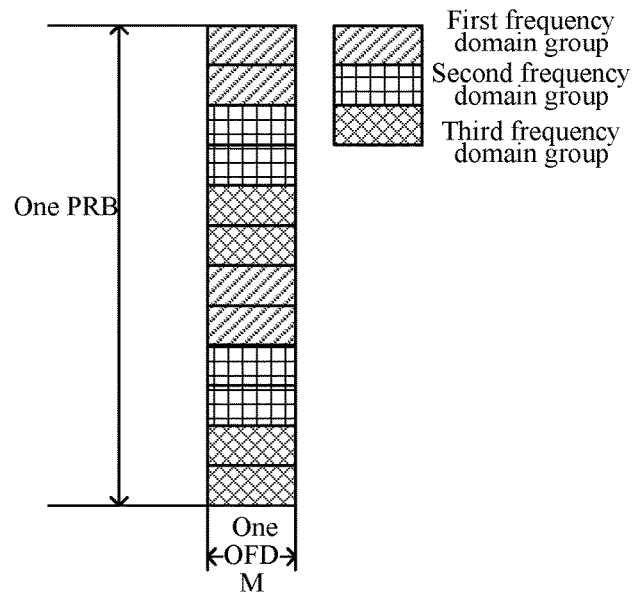
FIG. 4 is a pattern diagram of a pattern type two of a DMRS according to an embodiment of the present disclosure.

For example, the above resource request information or the first resource allocation information includes at least one of pieces of following information:

Information one: a demodulation reference signal pattern type (dmrs-Type), used for indicating whether the pattern type of the DMRS is the configuration type 1 in formula (1) or the configuration type 2 in formula (1), that is, whether the DMRS pattern is the pattern in FIG. 3 or the pattern in FIG. 4.

Information two: a number of consecutive time domain symbol groups other than the first consecutive time domain symbol group occupied by a demodulation reference signal, dmrs-AdditionalPosition, that is, DL-DMRS-add-pos in Table 4 or Table 5, used for indicating the number of consecutive time domain symbol groups occupied by the DMRS other than the first consecutive time domain symbol group, because the first consecutive time domain symbol group always exists.

Information three: a maximum number maxLength of time domain symbols included in a consecutive time domain symbol group occupied by the demodulation reference signal, used for indicating a maximum number of time domain symbols included in a consecutive time domain symbol group occupied by the DMRS. When maxLength is 1, $\bar{l}$ in the DMRS pattern formula (1) is obtained according to Table 4; when maxLength is 2, down link control information (DCI) can optionally indicate that a number of time-domain symbols included by a consecutive time domain symbol group occupied by the DMRS is 1 or 2, $\bar{l}$ in the DMRS pattern formula (1) is obtained according to Table 4 when the number is 1, and $\bar{l}$ in the DMRS pattern formula (1) is obtained according to Table 5 when the number is 2.

Information four: a generation parameter for generating a demodulation reference signal sequence, such as a virtual cell ID corresponding to the PN sequence generating the DMRS sequence, that is, $N_{ID}^{nSCID}$ in formula (3), and/or C-RNTI in formula (3).

Information five: a position of a starting time domain symbol of the DMRS is a position of a starting time domain symbol of the demodulation reference signal, that is in Table 4 or Table 5.

Information six: a number of time domain symbols included in one consecutive time domain symbol group occupied by the DMRS, that is, $\bar{l}$ in the DMRS pattern formula (1) is obtained according to Table 4 or Table 5. For example, when the number of time domain symbols included in one consecutive time domain symbol group occupied by the DMRS is 1, $\bar{l}$ is obtained according to Table 4, and when the number of time domain symbols included in one consecutive time domain symbol group occupied by the DMRS is 2, $\bar{l}$ is obtained according to Table 5. In NR, the base station does not configure this parameter for the UE through high layer signaling, but configures maxLength. When maxLength is 1, $\bar{l}$ is obtained according to Table 4, when maxLength is 2, optionally, whether $\bar{l}$ is obtained according to Table 4 or Table 5 can be obtained according to the dynamic signaling information DCI, that is, dynamic signaling informs whether the number of time domain symbols included in the consecutive time domain symbol group occupied by the DMRS is 1 or 2. However, when the two links are spatial division multiplexed on a Relay side, in order to ensure the orthogonality of the demodulation reference signals of the two links, the number of time domain symbols included in the consecutive time domain symbol group occupied by the DMRS in the two links is fixed to be either 1 or 2 through the high layer signaling or an agreed rule, and cannot be dynamically changed, so as to avoid interference between data of the B-D and the demodulation reference signal of the A-U when SDM multiplexing between B-D and A-U, or interference between data of the A-U and the demodulation reference signal of the B-D.

Information seven: whether transforming precoding of the PUSCH in the A-U is enabled, that is, whether transforming precoding of a channel corresponding to the demodulation reference signal is enabled, thus, the gNB/Relay1 can determine whether a DMRS port number (or a CDM group) can be shared with the A-U link on the Backhaul link.

Information eight: port information of the demodulation reference signal, that is, the port subset information in the ports {1000~1007} in Table 4, or the port subset information in {1000~1011} in Table 5, so that the B-D and the A-U use different port sets. For example, the gNB/Relay1 informs that ports occupied by the PUSCH/PUCCH on the B-U link are ports {1000,1001,1004,1005} in pattern type 1, then a downlink signal scheduled by the Relay2 on the A-D link cannot occupy REs occupied by the ports{1000,1001,1004, 1005}.

Information nine: a frequency domain group where a demodulation reference signal is located, that is A information in formula (1). Therefore, when the B-U and the A-D are multiplexed by the SDM, demodulation reference signals of the B-U and the A-D can be multiplexed by frequency division multiplexing, so that the B-U can use the PN sequence, and the A-D can use the ZC sequence.

Information ten: a time domain resource mapping manner is mapping type A or mapping type B, that is, a time domain resource mapping manner of the demodulation reference signal is fixed to one of mapping type A and mapping type B through the high layer signaling or the agreed rule, and do not dynamically change in mapping type A and mapping type B.

Information eleven: a range of a number (Duration in symbols) of time domain symbols occupied by a channel, it can be seen from the above that even if the above information one to information ten in the demodulation reference signals on the two links are coordinated, it still cannot ensure the orthogonality between the demodulation reference signals in the two links, because when the Duration in symbols changes dynamically, the time domain symbol where the DMRS is located will change. Therefore, it is needed to restrict a dynamic change range of the time domain symbols occupied by the channel. For example, as shown in Table 4, the time domain change range has the following 5 ranges: 1~2, 3~9, 10~11, 12, 13~14, or the time domain change range in Table 5 has the following 3 ranges: 4~9, 10~12, 13~14. Alternatively, the time domain change range can be determined according to the following configuration information: the time domain resource mapping manner (mapping type), the number DL-DMRS-add-pos of consecutive time domain symbol groups other than the first consecutive time domain symbol group occupied by the demodulation reference signal, whether the number of time domain symbols included in one consecutive time domain symbol group occupied by the demodulation reference signal is 1 (single-symbol) or 2 (double-symbol) to obtain multiple time domain ranges (that is, set of numbers of time domain symbols), for example, in a case of single-symbol, mapping typeA, DL-DMRS-add-pos=0, the change range of the time domain symbol is {3~14}, in a case of single-symbol, mapping type A, DL-DMRS-add-pos=1, the time domain range includes {3~7}, {8~9}, {10~12}, {13~14}. The gNB/Relay1 and Relay2 agree that a number of domain symbols included in the time domain resource list on the Backhaul can only belong to one of the above-mentioned agreed time domain symbol number sets, and cannot belong to multiple time-domain symbol number sets, therefore, according to the configuration information of the demodulation reference signal, demodulation reference signals corresponding to all time domain resources included in the time domain resource list have a same time domain position. That is, the position of the time domain symbol occupied by the demodulation reference signal does not change dynamically.

Information twelve: the time domain symbol set occupied by the demodulation reference signal, for example, the gNB/Relay1 informs the Relay2 of the time domain symbol set occupied by the demodulation reference signal on the Backhaul link, and the demodulation reference signal of the B-D link does not occupy the time domain symbol set other than the domain symbol set.

Information thirteen: a number of consecutive time domain symbol groups occupied by the demodulation reference signal is dmrs-AdditionalPosition+1, that is a number of consecutive time domain symbol groups occupied by the DMRS, thereby allowing the DMRS not to always occupy the first consecutive time domain symbol group.

It means that in the embodiments of the present disclosure, optionally, the first information and/or the second information further includes at least one of pieces of following information of a demodulation reference signal: a pattern type of the demodulation reference signal; a number of consecutive time domain symbol groups occupied by the demodulation reference signal; a maximum value of a number of time domain symbols comprised in one consecutive time domain symbol group occupied by the demodulation reference signal; a generation parameter for generating a demodulation reference signal sequence; a position of a starting time domain symbol of the demodulation reference signal; a time domain resource mapping manner of the demodulation reference signal; a number of time domain symbols comprised in one consecutive time domain symbol group occupied by the demodulation reference signal; whether transforming precoding of a channel corresponding to the demodulation reference signal is enabled, port information of the demodulation reference signal; a frequency domain group where a demodulation reference signal port is located; a time domain symbol set occupied by the demodulation reference signal; a number of consecutive time domain symbol groups other than a first consecutive time domain symbol group, occupied by the demodulation reference signal; or a range of time domain symbols occupiable by the demodulation reference signal.

Optionally, in order to ensure the orthogonality of the DMRSs of the two links and ensure that the DMRSs of the two links are in a CDM group, it is required that the B-D can use the ZC sequence, because the demodulation reference signal of the B-U can use the ZC sequence. The ZC sequence can also be referred to as a Low-PAPR sequence. This sequence can be referred to the 3GPP standard protocol 38.211 v15.0.0 version. Optionally, the B-D may be optionally limited to using the ZC sequence only when the pattern type of the demodulation reference signal is limited to Configuration1, and optionally signaling is required to inform that a sequence of the downlink demodulation reference signal is a PN sequence or a ZC sequence. The PN sequence is a random sequence, that is, a Pseudo-random sequence in the 3GPP standard protocol 38.211 v15.0.0.

In the case of SDM of two links, in order to ensure that the DMRSs are orthogonal, or at least ensure that data of one link does not interfere with data of another link, the gNB/Relay1 may inform a time domain symbol range occupiable by the demodulation reference signal of the PDSCH on the B-D link, that is, the time domain symbol range occupied by the demodulation reference signal of the PDSCH on the B-D link occupies may only be within the occcupiable time domain symbol range, optionally, the Relay2 schedules a channel or signal transmitted by the Relay3/UE on the A-U not to occupy the time domain symbol range occupiable by the DMRS.

The above is to allocate the demodulation reference signal resources of the two links, and similarly in a case of the SDM of the two links, in order to ensure that the control channels are not interfered, it is preferable that the control channels of the two links do not need the spatial division multiplexing, for example, the gNB/Relay1 informs the control channel resources such as a control resource set (CORESET) on the B-D link, and optionally the Relay2 schedules the channel or signal transmitted by the Relay3/UE on the A-U to not occupy the time-frequency resource occupied by the control channel on the B-D link. It needs to be noted that a time domain resource corresponding to a CORESET is configured in a Search space associated with the CORESET. Alternatively, the Relay2 requests the gNB/Relay1 for resources occupied by an uplink control channel of the A-U transmitted by multiple Relay3/UEs covered by the Relay2, and the Relay2 requires that the gNB/Relay1 does not allocate the channel or signal of the B-D on the resources occupied by the uplink control channel of the A-U, at the same time, the Relay2 does not receive the channel or signal of the B-D on the resources occupied by the uplink control channel of the A-U.

Similarly, other reference signal resources of the two links may be coordinated according to the above allocation method, where the reference signal resource includes: a phase tracking reference signal, a measurement reference signal, a tracking reference signal (TRS), and a synchronization signal.

Example 3

Figure 5A:
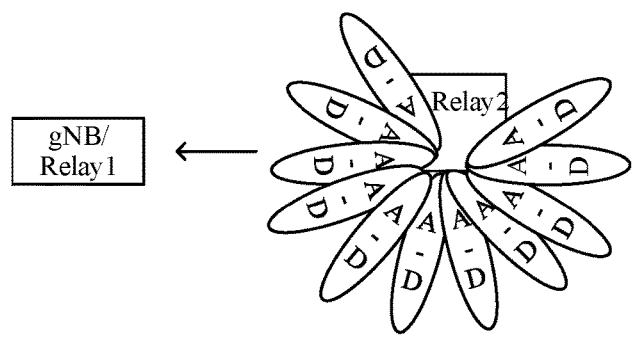
FIG. 5A shows that Relay2 transmits SRS to gNB/Relay1 by the A-D pre-used beam according to an embodiment of the present disclosure.
Figure 5B:
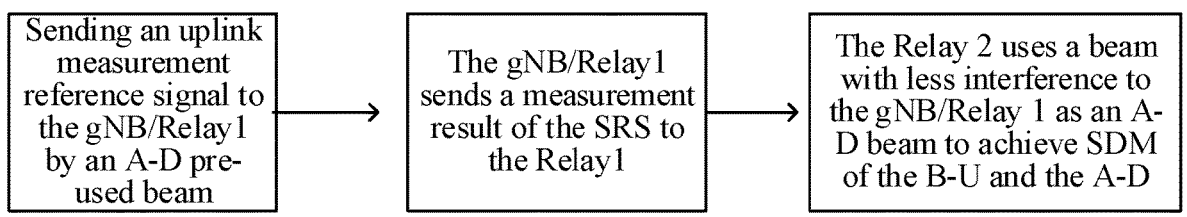
FIG. 5B shows that gNB/Relay1 sends a channel measurement result of a uplink measurement reference signal to Relay2 on the downlink according to an embodiment of the present disclosure.

In this example, taking the B-U and A-D links as an example, in order to ensure that the two links can be SDM multiplexed, it is required that isolation between beams of the two links is relatively high as much as possible. Due to relatively low signal quality of a beam used by A-D reaching B-U, the SDM multiplexing manner can be used between the A-D and the B-U. A process shown in FIG. 5B is needed. As shown in FIG. 5A, Relay2 transmits a beam that the A-D intends to use to the gNB/Relay1 by the SRS, and then the gNB/Relay1 transmits channel state information obtained based on the SRS to the Relay2 in a downlink channel or signal.

For example, in FIG. 5A, the Relay2 sends P SRS resources to the gNB/Relay1, where different SRS resources represent different beams, and the gNB/Relay1 sends the channel state information to the Relay2, where the channel state information includes indication information of P2 SRS resources, and the gNB/Relay1 and the Relay2 agree that the indication information of the P2 SRS resource satisfies at least one of the following conditions: P2 SRS resources with the lowest signal quality reaching the gNB/Relay1 among the P SRS resources, the P2 SRS resources and the SRS in the agreed first SRS set have different SRS spatial receiving parameters (that is, the P2 SRS resources and the SRS in the agreed first SRS have different receiving beams reaching the gNB/Relay1), and/or the P2 SRS resources and the SRS in the agreed first SRS set do not satisfy a quasi-co-location (QCL) relationship with respect to spatial receiving filtering parameters.

In this example, the signal quality may be at least one of the following signal qualities: references signal receiver power (RSRP), a reference signal receiver quality (RSRQ), a signal to interference noise ratio (SINR), or a channel quality indicator (CQI).

The first SRS set includes at least one of the following SRS resources:

an SRS included in an SRS set which is allocated by the gNB/Relay1 to the Relay2 and is used for non-codebook transmission, where the spatial filtering parameter of the PUSCH can be obtained according to any one or more SRS resources in the SRS se. That is, the SRS resource, when reaching the gNB/Relay1, has a good performance, and can be used for a candidate beam of the PUSCH;

an SRS included in the SRS set which is allocated by the gNB/Relay1 to the Relay2 and is used for codebook transmission, where precoding information of the PUSCH can obtain the SRS resource according to any one of the SRS sets and the informed in the DCI and based on a PMI of the SRS resource informed in the DCI. The SRS resource, when reaching the gNB/Relay1, has a good performance, and can be used for a candidate beam of the PUSCH; or an SRS resource included in the spatial filter parameter of the PUCCH which is allocated to the Relay2 by the gNB/Relay1, where the spatial filter parameters of the PUCCH may be a spatial filter parameters used during transmitting a configured PUCCH, that is, spatial filter parameters used for real PUCCH transmission, or a spatial parameter list of the PUCCH, for example, the RRC configures 4 spatial filter parameter lists for the PUCCH, and a Medium Access Control element (MAC-CE) activates one of the spatial filter parameters for the PUCCH. The first SRS set may only include an SRS included in the spatial filtering parameter in the MAC-CE activation, or may also include an SRS included in the 4 spatial filtering parameters configured by the RRC, that is, these beams as candidate beams, when reach the gNB/Relay1, have good performance, so that it is required that beams used by the A-D and these beams are in different receiving beams.

The channel feedback information mentioned above only includes SRS resource indication information for indicating predetermined features of the SRS resources. In another implementation of this embodiment, the channel feedback information may also include at least one of pieces of the following information: resource indication information, a signal quality, precoding information such as Precoding matrix Indicator (PMI), or a Rank Indicator (RI). A signal quality of the resource in the resource indication information may have the best signal quality among signal qualities of the P SRS resources, so that Relay2 knows that the A-D with these beams will cause great interference to the B-D, and thus these beams should be avoided in the A-D.

Example 4

Figure 6A:
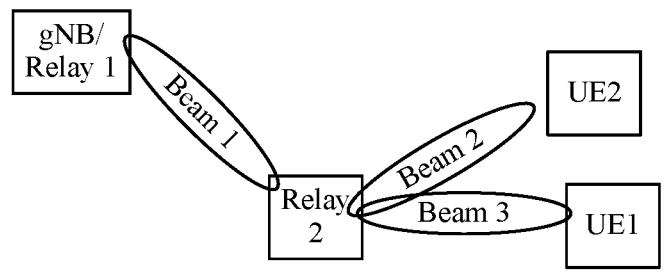
FIG. 6A is a schematic diagram of spatial division multiplexing of a Backhaul link and an Access links according to an embodiment of the present disclosure.

In this example, whether the two links can use the SDM depends on capability of the Relay2 in FIG. 2. For example, if Relay2 has only one panel, the SDM cannot be used. Or, if the beam isolation on the UE and Backhaul link covered by the Relay2 is relatively high, for example, as shown in FIG. 6A, the isolation of beams of the Backhaul link and the Access link is very good and the beams are located in two back-to-back panels of the Relay2, and thus, the Backhaul link and the Access link can use the spatial division multiplexing.

If the Relay2 has only one panel, or the beam isolation between Backhaul link and the Access link is not good, then Backhaul link and Access link cannot use the SDM, so resource request information sent by the Relay2 to the gNB1/Relay1 includes a spatial domain resource request, where the spatial domain resource request indicates the beam used by the A-D, and gNB1/Relay1 determines whether the two links can perform the SDM according to the measurement result of the uplink measurement reference signal sent by the Relay2 and the spatial domain resource included in the resource request information.

Alternatively, the Relay2 sends the resource request information to the gNB1/Relay1 according to the measurement result. The resource request information informs a set of available multiplexing manners for the two links. The set of available multiplexing manner for the two links includes at least one of the following: TDM, FDM, or SDM.

Figure 6B:
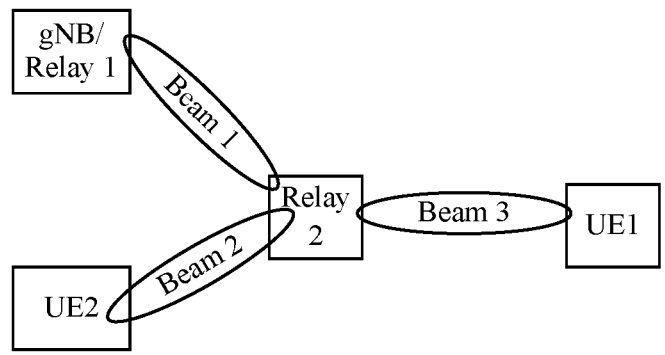
FIG. 6B is a schematic diagram showing that whether a Backhaul link and an Access link can be space division multiplexed depends on a position of a terminal according to an embodiment of the present disclosure.

Alternatively, as shown in FIG. 6b, whether the two links can perform the SDM depends on the UE covered by the Relay2, so that the set of available multiplexing manners in the resource request is associated with the time domain resources, and different time domain resources can correspond to different sets of available multiplexing manners for the two links, and/or the set of available multiplexing manner in the resource request is associated with the frequency domain resources, and different frequency domain resources can correspond to different sets of available multiplexing manners for the two links.

Example 5

Figure 7:
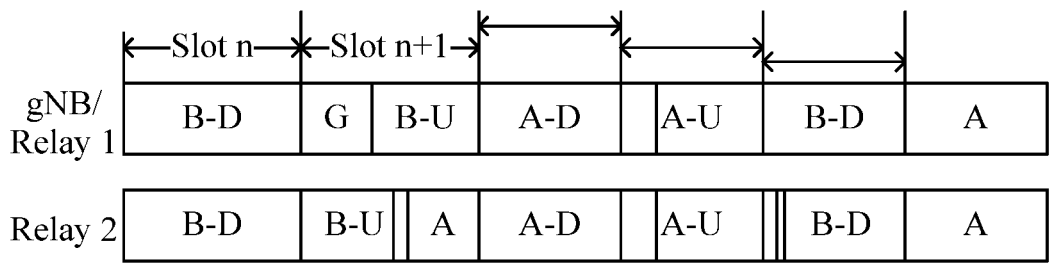
FIG. 7 is a diagram shows that time domains may overlap when B-U and A links are allocated on the gNB/Relay1 side due to the advance of the B-U on the Relay2 side according to an embodiment of the present disclosure.

In this example, as shown in FIG. 7, the Backhaul link and Access link can only use time division multiplexing, and cannot use frequency division multiplexing or spatial division multiplexing. The gNB/Relay1 allocates a frame structure of the Backhaul and also allocates a frame structure of the Access. However, because the Relay2 side will advance transmission time of the B-U to ensure that gNB/Relay1 receives the B-U at a position shown in FIG. 7, so that if the B-U is next to the A-D/A-U, the Relay2 side will be idle, that is, a frame structure in the gNB/Relay1 side is shown in the upper diagram in FIG. 7, and a structure on the Relay2 side is shown in the lower diagram in FIG. 7 due to the advancement of the B-U. In the time domain resources shown in the grids in FIG. 7, the gNB/Relay1 allocates both B-U resources and the A-D/A-U, that is, on the gNB/Relay1 side, it can be seen that the time domain overlaps between the B-U and A-D/A-U, but the two channels on the Relay2 side are still time division multiplexed.

Figure 8A:
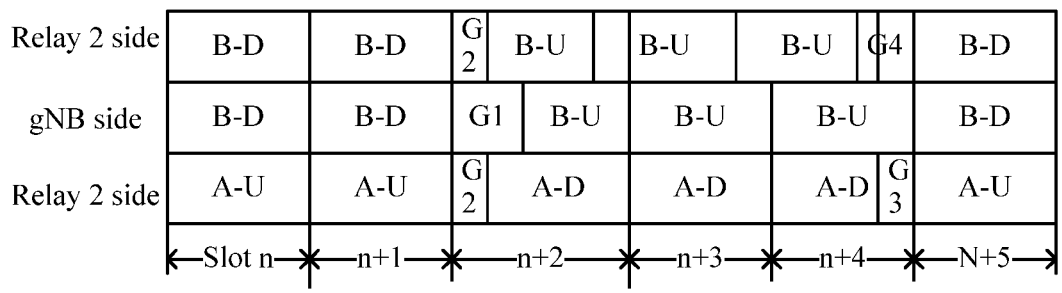
FIG. 8A is a schematic diagram showing that a transmission delay from the gNB/Relay1 to the Relay2 is different from a transmission delay from the Relay2 to the Relay3/UE due to the B-U advance at Relay2 side according to an embodiment of the present disclosure.
Figure 8B:
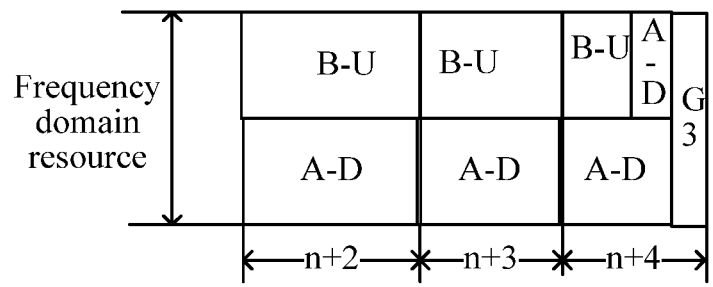
FIG. 8B is a schematic diagram 1 showing that due to the B-U advance at Relay2 side, available PRB sets for the A-D in different time domains are different according to an embodiment of the present disclosure.

In FIG. 8A~8B, a G1 time interval is t1+2TX/RX, where t1 is a transmission delay from the gNB/Relay1 to the Relay2, TX/RX represents a transceiver conversion time, G2 represents a transceiver conversion time, and G3 is t3+2TX/RX, t1 is a transmission delay from the Relay2 to the Relay3/UE, and G4 is equal to G1 minus G2.

As shown in FIG. 8A, the BU and the A-D are frequency division multiplexed. Due to the advancement of BU on the Relay2 side, in n+4 slot, a period of idle time exists between BU and the B-D, and the interval between A-D and the AU is only for transceiver conversion; when the time interval G4 is much greater than G3 (for example, the transmission delay from the gNB/Relay1 to the Relay2 is much greater than the transmission delay from the Relay2 to the Relay3/UE), the A-D can correspond to different frequency domain resources in different time periods, so that when the B-U and the A-D are frequency division multiplexed, the frequency domain resources occupiable by the A-D and the time domain resources occupiable by the A-D are associated. There are following manners:

Manner 1:

A PRB set included in a BWP occupied by the A-D is associated with the time domain resources, such as before slot {n+2, n+3, n+4}, a PRB set included a BWP1 corresponding to A-D is PRBk~PRBk+20, and after slot {n+4}, a PRB set included the BWP1 is PRBk~PRBk+40, so that in different time domain resources, numbers of bits indicating the index information of the PRB sets in the BWP may be different in the DCI.

Manner 2:

The A-D corresponds to different sets of available BWPs in different time domain resources. For example, before slot {n+2, n+3, n+4}, the available BWP for the A-D includes only the BWP1, and after slot {n+4}, available BWPs for the A-D include {BWP1, BWP2}. The DCI dynamically indicates BWPs occupied by the channel or signal of the A-D in the available BWPs, where the BWP1 includes PRBk~PRBk+20, and the BWP2 includes PRBk+21~PRBk+40, so that numbers of bits of a bit field for indicating the BWP indication information in the DCI in different time domain resources may be different.

Manner 3:

A PRB set occupiable by the A-D among the PRB sets included in one BWP is associated with time domain resources. For example, BWP3 includes PRBk~PRBk+40, such as before slot {n+2, n+3, n+4}, a PRB set occupiable by the A-D among PRBk~PRBk+40 included in BWP3 is PRBk~PRBk+20, and after slot {n+4}, a PRB set occupiable by the A-D among PRBk~PRBk+40 included in BWP3 is PRBk~PRBk+40, so that PRB sets occupiable by the PDSCH in the A-D indicated in different time domain resource DCI are different.

Figure 8C:
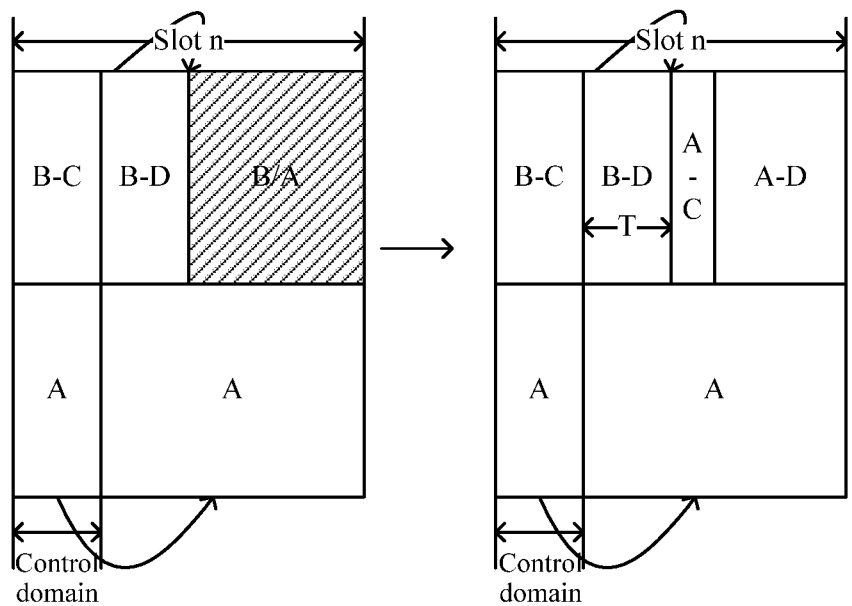
FIG. 8C is a schematic diagram 2 showing that available PRB sets for the A-D link in different time domains are different according to an embodiment of the present disclosure.

In another implementation of this example, as shown in FIG. 8C, if the B link and the A link implement dynamic sharing within a slot level, it may be indicated in the first resource allocation indication information that the B/A resource is determined to be the B link or the A link through dynamic signaling, and other resources of the first resource allocation indication information are occupied by either the A link or the B link. Therefore, the available PRB resources for the A-link are different in the first half of a slot and the second half of the slot.

In the embodiment of the present disclosure, the method further includes steps described below.

The first communication node receives first signaling information sent by the second communication node, where the first signaling information includes scheduling information of a measurement reference signal;

the first communication node sends the measurement reference signal to the second communication node; and the first communication node receives channel state information corresponding to the measurement reference signal sent by the second communication node.

In the embodiment of the present disclosure, optionally, the measurement reference signal is an uplink measurement reference signal.

In the embodiment of the present disclosure, optionally, the step in which the channel state information corresponding to the measurement reference signal sent by the second communication node is received includes a step described below.

The channel state information corresponding to the measurement reference signal sent by the second communication node is received, in a downlink channel, and/or in a downlink signal, and/or in a periodic downlink channel, and/or in a periodic downlink signal.

In the embodiment of the present disclosure, optionally, the channel state information includes reference signal resource indication information and/or reference signal quality indication information.

In the embodiment of the present disclosure, optionally, the channel state information satisfies at least one of the following conditions:

the channel state information includes indication information of P1 reference signal resources, the P1 reference signal resources correspond to P1 reference signal resources with the lowest signal quality among P reference signal resources sent by the first communication node, and P1 is an integer;

the channel state information includes indication information of P2 reference signal resources, receiving filter parameters corresponding to the P2 reference signal resources are different from receiving filter parameters corresponding to reference signals in a first reference signal set, and P2 is an integer; or the channel state information includes indication information of P2 reference signal resource, and the P2 reference signal resources and reference signals in a first reference signal set do not satisfy a quasi-co-location relationship with respect to spatial receiving filtering parameters.

In the embodiment of the present disclosure, optionally, the first reference signal set satisfies at least one of the following conditions:

the first reference signal set includes a sounding reference signal (SRS, which is also called as measurement reference signal) included in an uplink SRS set which is configured to the first communication node by the second communication node and is used for non-codebook transmission;

the first reference signal set includes an SRS included in an uplink SRS set which is configured to the first communication node by the second communication node and is used for codebook transmission;

the first reference signal set includes an SRS included in a spatial filtering parameter acquisition parameter of a channel sent by the first communication node to the second communication node, where the channel includes a data channel and/or a control channel;

the first reference signal set includes an SRS included in an acquisition parameter of a precoding parameter of a channel sent by the first communication node to the second communication node, where the channel includes a data channel and/or a control channel;

a reference signal in the first reference signal set, when reaching the second communication node, has a performance higher than a predetermined value;

a reference signal in the first reference signal set is a reference signal sent by the first communication node to the second communication node; or the first reference signal set is a predetermined reference signal set.

In the embodiment of the present disclosure, the method further includes steps described below.

The first communication node sends second signaling information to the second communication node, where the second signaling information carries at least one of pieces of the following indication information:

whether the first communication node needs to receive the channel state information;

whether the first communication node needs to receive channel state information corresponding to the reference signal; or whether a reference signal sent by the first communication node has corresponding channel state information to be received.

Embodiment Two

An embodiment of the present disclosure provides a resource allocation method, including steps described below.

A second communication node receives resource request information sent by a first communication node, where the resource request information includes first information; and/or the second communication node sends resource allocation information to the first communication node, where the resource allocation information includes second information;

the first information and/or the second information includes information of a resource occupiable by a channel or signal between the first communication node and the second communication node, and/or includes information of a resource occupiable by a channel or signal between the first communication node and one or more third communication nodes.

The embodiments of the present disclosure implement resource coordination between the first communication node and the second communication node, and ensure orthogonality between reference signals and/or control channels during spatial division multiplexing between the Backhaul link and the Access link, thereby enabling the Relay node to effectively process channels or signals of the Backhaul link and channels or signals of the Access link, and effectively solving an interference problem during spatial division multiplexing of the Backhaul link and the Access link.

In the embodiment of the present disclosure, optionally, the information of the resource occupiable by the channel or signal between the first communication node and the second communication node includes at least one of pieces of following information:

on the resource, the first communication node is unable to receive a channel and/or a signal sent by the second communication node;

on the resource, the first communication node is unable to receive a channel and/or a signal sent by the second communication node;

outside the resource, the first communication node is able to receive a channel and/or a signal sent by the second communication node; or outside the resource, the first communication node is able to send a channel and/or a signal to the second communication node; and, the information of the resource occupiable by the channel or signal between the first communication node and the one or more third communication nodes includes at least one of pieces of following information:

on the resource, the first communication node receives a channel and/or a signal sent by the one or more third communication nodes;

on the resource, the first communication node sends a channel and/or a signal to the at least one third communication node;

outside the resource, the first communication node is unable to receive a channel and/or a signal sent by the one or more third communication nodes; or outside the resource, the first communication node is unable to send a channel and/or a signal to the one or more third communication nodes.

In the embodiment of the present disclosure, optionally, the information of the resource occupiable by the channel or signal between the first communication node and the second communication node includes at least one of pieces of following information:

on the resource, the first communication node is able to receive a channel and/or a signal sent by the second communication node;

on the resource, the first communication node is able to send a channel and/or a signal to the second communication node;

outside the resource, the first communication node does not receive a channel and/or a signal sent by the second communication node; or outside the resource, the first communication node does not send a channel and/or a signal to the second communication node; and the information of the resource occupiable by the channel or signal between the first communication node and the one or more third communication nodes includes at least one of pieces of following information:

on the resource, the first communication node is unable to receive a channel and/or a signal sent by the one or more third communication nodes;

on the resource, the first communication node is unable to send a channel and/or a signal to the one or more third communication nodes;

outside the resource, the first communication node is able to receive a channel and/or a signal sent by the one or more third communication nodes; or outside the resource, the first communication node is able to send a channel and/or a signal to the one or more third communication nodes.

In the embodiment of the present disclosure, optionally, the first information and/or the second information further includes at least one of pieces of following information of a demodulation reference signal:

a pattern type of the demodulation reference signal; a number of consecutive time domain symbol groups occupied by the demodulation reference signal; a maximum value of a number of time domain symbols included in one consecutive time domain symbol group occupied by the demodulation reference signal; a generation parameter for generating a demodulation reference signal sequence; a position of a starting time domain symbol of the demodulation reference signal; a time domain resource mapping manner of a data channel corresponding to the demodulation reference signal; a number of time domain symbols included in one consecutive time domain symbol group occupied by the demodulation reference signal; whether transforming precoding of a channel corresponding to the demodulation reference signal is enabled, port information of the demodulation reference signal; a frequency domain group where a demodulation reference signal port is located; a time domain symbol set occupied by the demodulation reference signal; a number of consecutive time domain symbol groups, other than a first consecutive time domain symbol group, occupied by the demodulation reference signal; or a range of time domain symbols occupiable by the demodulation reference signal.

In the embodiment of the present disclosure, optionally, the step in which the resource request information sent by the first communication node is received includes steps described below.

resource request indication information sent by the first communication node is received in an uplink channel or an uplink signal; and a step in which the resource allocation information is sent to the first communication node includes a step described below.

the resource allocation information is sent to the first communication node in a downlink channel or a downlink signal.

In the embodiment of the present disclosure, optionally, the first information and/or the second information further includes following information:

multiplexing manner information usable between a first channel or a first signal and a second channel or a second signal, where the first channel or signal is a channel or signal between the first communication node and the second communication node, and the second channel or signal is a channel or signal between the first communication node and the one or more third communication nodes.

In the embodiment of the present disclosure, optionally, the information of multiplexing manner satisfies at least one of the following conditions:

a multiplexing manner usable by a first control channel and a second control channel is a subset of a multiplexing manner set usable between a third channel or signal and a fourth channel or signal, where the first control channel is a control channel between the first communication node and the second communication node, and the second control channel is a control channel between the first communication node and the one or more third communication nodes; or a multiplexing manner set usable by a first reference signal and a second reference signal is a subset of a multiplexing manner set usable between the third channel or signal and the fourth channel or signal; the first reference signal is a reference signal between the first communication node and the second communication node, and the second reference signal is a reference signal between the first communication node and the one or more third communication nodes; the third channel or signal is another channel or signal between the first communication node and the second communication node, the fourth channel or signal is another channel or signal between the first communication node and the one or more third communication nodes, and the another channel or signal is any channel or signal other than the control channel and/or the reference signal.

In the embodiment of the present disclosure, optionally, multiplexing manner set usable by the first control channel and the second control channel is a first multiplexing manner set; the multiplexing manner set usable by the first reference signal and the second reference signal is a second multiplexing manner set; the multiplexing manner set usable by the third channel or the third signal and the fourth channel or the fourth signal is a third multiplexing manner set;

the first multiplexing manner set and/or the second multiplexing manner set does not include a spatial division multiplexing manner, and the third multiplexing manner set includes a spatial division multiplexing manner.

In the embodiment of the present disclosure, optionally, the method further includes steps described below.

The second communication node communicates with the first communication node according to the resource allocation information and/or the resource request indication information.

In the embodiments of the present disclosure, optionally, the first resource allocation information satisfies at least one of the following conditions:

the first resource allocation information includes a time domain resource list occupiable by the channel, and all time domain resources included in the time domain resource list have a same time domain resource mapping manner;

the first resource allocation information includes a time domain resource list occupiable by the channel and a number of time domain symbols corresponding to all time domain resources included in the time domain resource list belongs to one predetermined set of numbers of time domain symbols;

the first resource allocation information includes a time domain resource list occupiable by the channel, and the time domain symbols of demodulation reference signals corresponding to all time domain resources included in the time domain resource list satisfy an agreed condition;

the first resource allocation information is included in high layer signaling information;

an intersection between a resource included in the first resource allocation information and a time-frequency resource occupied by the control channel resource which is included in the resource request information is empty;

an intersection between a resource included in the first resource allocation information and a time-frequency resource occupied by the control channel resource is empty, where control channel resource is included in the resource request information; or an intersection between a time domain resource occupiable by the first channel or signal and the first resource allocation information included and a time domain resource occupiable by the second channel or signal included in the first resource allocation information is non-empty, where the first channel or signal is a channel or signal sent by the first communication node to the second communication node, and/or the first channel or signal is followed by a third channel or signal, and the second channel or signal is a channel or signal sent by the first communication node to the one or more third communication nodes, and the third channel or signal is a channel or signal received by the first communication node.

In the embodiment of the present disclosure, optionally, the one predetermined set of numbers of time domain symbols satisfies at least one of the following conditions:

the one predetermined set of numbers of time domain symbols is obtained according to an agreed rule;

time domain symbol positions of demodulation reference signals corresponding to all numbers of time domain symbols in the set of numbers of time domain symbols are the same, the time domain symbol positions are obtained according to high layer signaling configuration information of the demodulation reference signals;

the one predetermined set of numbers of time domain symbols is one of a plurality of predetermined sets of numbers of time domain symbols;

the one predetermined set of numbers of time domain symbols is one of a plurality of predetermined sets of numbers of time domain symbols, and the plurality of predetermined sets of numbers of time domain symbols are obtained according to high layer configuration information of the demodulation reference signals; or the one predetermined set of numbers of time domain symbols is one of a plurality of predetermined sets of numbers of time domain symbols, and the plurality of predetermined sets of numbers of time domain symbols are obtained according to a first parameter of the demodulation reference signal, and the first parameter includes at least one of the following parameters: a time domain resource mapping manner, a number of consecutive time domain symbol groups other than a first consecutive time domain symbol group occupied by the demodulation reference signal, or a number of time domain symbols included in the consecutive time domain symbol groups occupied by the demodulation reference signal.

In the embodiment of the present disclosure, optionally, the channel or signal includes at least one of the following channels or signals:
a channel or signal sent by the first communication node to the one or more third communication nodes, a channel or signal sent by the one or more third communication nodes to the first communication node, a channel or signal sent by the second communication node to the first communication node, or a channel or signal sent by the first communication node to the second communication node, where the channel is a data channel and/or a control channel.

In the embodiment of the present disclosure, optionally, the reference signal includes at least one of the following signals: a demodulation reference signal, a phase tracking reference signal, or a measurement reference signal.

In the embodiment of the present disclosure, optionally, the resource includes at least one of the following resources: a reference signal resource, a time domain resource, a frequency domain resource, a spatial domain resource, a code domain resource, or a control channel resource.

In the embodiment of the present disclosure, optionally, the time domain resource includes at least one of:
a range of a number of time domain symbols occupiable by the channel or signal in one time unit, a time unit set occupiable by the channel or signal, the number of time domain symbols occupiable by the channel or signal in a time unit, a time domain symbol set occupied by the channel or signal in a time unit, or a subcarrier spacing corresponding to a time domain symbol where the channel or signal is located.

In the embodiment of the present disclosure, optionally, information of the frequency domain resource includes at least one of pieces of following information:
bandwidth part (BWP) information, component carrier (CC) information, information of a physical resource block (PRB) set in a bandwidth part (BWP), or information of a subcarrier spacing corresponding to the frequency domain resource.

In the embodiment of the present disclosure, optionally, the code domain resource information includes at least one of pieces of following information: generation parameter information of a scrambling sequence of the channel, or sequence generation information of a reference signal.

In the embodiment of the present disclosure, optionally, one spatial domain resource corresponds to one measurement reference signal resource; and/or one spatial domain resource corresponds to one port group of one measurement reference signal resource.

In the embodiments of the present disclosure, the method further includes steps described below.

The second communication node sends first signaling information, where the first signaling information is used for instructing the first communication node to send a reference signal;
the second communication node determines a spatial domain resource in the resource allocation information and/or channel state information according to a reference signal sent by the first communication node; and
the second communication node sends the channel state information to the first communication node.

In the embodiment of the present disclosure, optionally, the reference signal is an uplink reference signal.

In the embodiment of the present disclosure, optionally, the reference signal is an uplink reference signal.

In the embodiment of the present disclosure, optionally, the step in which the channel state information is sent to the first communication node includes steps described below.

The channel state information is sent to the first communication node, in a downlink channel, and/or in a downlink signal, and/or in a periodic downlink channel, and/or in a periodic downlink signal.

In the embodiment of the present disclosure, optionally, the channel state information includes reference signal resource indication information and/or reference signal quality indication information.

In the embodiment of the present disclosure, optionally, the channel state information satisfies at least one of the following conditions:
the channel state information includes indication information of P1 reference signal resources, the P1 reference signal resources correspond to P1 reference signal resources with the lowest signal quality among P reference signal resources sent by the first communication node, and P1 is an integer;
the channel state information includes indication information of P2 reference signal resources, receiving filter parameters corresponding to the P2 reference signal resources are different from receiving filter parameters corresponding to reference signals in a first reference signal set, and P2 is an integer; or
the channel state information includes indication information of P2 reference signal resource, and the P2 reference signal resources and reference signals in a first reference signal set do not satisfy a quasi-co-location relationship with respect to spatial receiving filtering parameters.

In the embodiment of the present disclosure, optionally, the first reference signal set satisfies at least one of the following conditions:
the first reference signal set includes measurement reference signals (SRS) included in an uplink SRS set which is configured to the first communication node by the second communication node and is used for non-codebook transmission;
the first reference signal set includes an SRS included in an uplink SRS set which is configured to the first communication node by the second communication node and is used for codebook transmission;
the first reference signal set includes an SRS included in a spatial filtering parameter acquisition parameter of a channel sent by the first communication node to the second communication node, where the channel includes a data channel and/or a control channel;
the first reference signal set includes an SRS included in an acquisition parameter of a precoding parameter of a channel sent by the first communication node to the second communication node, where the channel includes a data channel and/or a control channel;
a reference signal in the first reference signal set, when reaching the second communication node, has a performance higher than a predetermined value;
a reference signal in the first reference signal set is a reference signal sent by the first communication node to the second communication node; or
the first reference signal set is a predetermined reference signal set.

In the embodiment of the present disclosure, the method further includes steps described below.

The second communication node sends second signaling information to the first communication node, where the second signaling information carries at least one of pieces of the following indication information:
whether the first communication node needs to receive the channel state information;

whether the first communication node needs to receive channel state information corresponding to the reference signal; or whether a reference signal sent by the first communication node has corresponding channel state information to be received.

When the embodiment of the present disclosure is specifically implemented, reference may be made to embodiment one.

Embodiment Three

An embodiment of the present disclosure provides a measurement method, including steps described below.

A first communication node receives first signaling information sent by a second communication node, where the first signaling information includes scheduling information of a measurement reference signal;

the first communication node sends the measurement reference signal to the second communication node; and the first communication node receives channel state information corresponding to the measurement reference signal sent by the second communication node.

In the embodiment of the present disclosure, optionally, the measurement reference signal is an uplink measurement reference signal.

In the embodiment of the present disclosure, optionally, the step in which the channel state information corresponding to the measurement reference signal sent by the second communication node is received includes a step described below.

The channel state information corresponding to the measurement reference signal sent by the second communication node is received, in a downlink channel, and/or in a downlink signal, and/or in a periodic downlink channel, and/or in a periodic downlink signal.

In the embodiment of the present disclosure, optionally, the channel state information includes reference signal resource indication information and/or reference signal quality indication information.

In the embodiment of the present disclosure, optionally, the channel state information satisfies at least one of the following conditions:

the channel state information includes indication information of P1 reference signal resources, the P1 reference signal resources correspond to P1 reference signal resources with the lowest signal quality among P reference signal resources sent by the first communication node, and P1 is an integer;

the channel state information includes indication information of P2 reference signal resources, receiving filter parameters corresponding to the P2 reference signal resources are different from receiving filter parameters corresponding to reference signals in a first reference signal set, and P2 is an integer; or the channel state information includes indication information of P2 reference signal resource, and the P2 reference signal resources and reference signals in a first reference signal set do not satisfy a quasi-co-location relationship with respect to spatial receiving filtering parameters.

In the embodiment of the present disclosure, optionally, the first reference signal set satisfies at least one of the following conditions:

the first reference signal set includes measurement reference signals (SRS, which are also called as measurement reference signals) included in an uplink SRS set which is configured to the first communication node by the second communication node and is used for non-codebook transmission;

the first reference signal set includes an SRS included in an uplink SRS set which is configured to the first communication node by the second communication node and is used for codebook transmission;

the first reference signal set includes an SRS included in a spatial filtering parameter acquisition parameter of a channel sent by the first communication node to the second communication node, where the channel includes a data channel and/or a control channel;

the first reference signal set includes an SRS included in an acquisition parameter of a precoding parameter of a channel sent by the first communication node to the second communication node, where the channel includes a data channel and/or a control channel;

a reference signal in the first reference signal set, when reaching the second communication node, has a performance higher than a predetermined value;

a reference signal in the first reference signal set is a reference signal sent by the first communication node to the second communication node; or the first reference signal set is a predetermined reference signal set.

In the embodiment of the present disclosure, the method further includes steps described below.

The first communication node sends second signaling information to the second communication node, where the second signaling information carries at least one of pieces of the following indication information:

whether the first communication node needs to receive the channel state information;

whether the first communication node needs to receive channel state information corresponding to the reference signal; or whether a reference signal sent by the first communication node has corresponding channel state information to be received.

Embodiment Four

An embodiment of the present disclosure provides a measurement method, including steps described below.

The second communication node sends first signaling information, where the first signaling information is used for instructing the first communication node to send a reference signal;

the second communication node determines a spatial domain resource in the resource allocation information and/or channel state information according to a reference signal sent by the first communication node; and the second communication node sends the channel state information to the first communication node.

In the embodiment of the present disclosure, optionally, the reference signal is an uplink reference signal.

In the embodiment of the present disclosure, optionally, the step in which the channel state information is sent to the first communication node includes steps described below.

The channel state information is sent to the first communication node, in a downlink channel, and/or in a downlink signal, and/or in a periodic downlink channel, and/or in a periodic downlink signal.

In the embodiment of the present disclosure, optionally, the channel state information includes reference signal resource indication information and/or reference signal quality indication information.

In the embodiment of the present disclosure, optionally, the channel state information satisfies at least one of the following conditions:
the channel state information includes indication information of P1 reference signal resources, the P1 reference signal resources correspond to P1 reference signal resources with the lowest signal quality among P reference signal resources sent by the first communication node, and P1 is an integer;
the channel state information includes indication information of P2 reference signal resources, receiving filter parameters corresponding to the P2 reference signal resources are different from receiving filter parameters corresponding to reference signals in a first reference signal set, and P2 is an integer; or
the channel state information includes indication information of P2 reference signal resource, and the P2 reference signal resources and reference signals in a first reference signal set do not satisfy a quasi-co-location relationship with respect to spatial receiving filtering parameters.

In the embodiment of the present disclosure, optionally, the first reference signal set satisfies at least one of the following conditions:
the first reference signal set includes measurement reference signals included in an uplink SRS set which is configured to the first communication node by the second communication node and is used for non-codebook transmission;
the first reference signal set includes an SRS included in an uplink SRS set which is configured to the first communication node by the second communication node and is used for codebook transmission;
the first reference signal set includes an SRS included in a spatial filtering parameter acquisition parameter of a channel sent by the first communication node to the second communication node, where the channel includes a data channel and/or a control channel;
the first reference signal set includes an SRS included in an acquisition parameter of a precoding parameter of a channel sent by the first communication node to the second communication node, where the channel includes a data channel and/or a control channel;
a reference signal in the first reference signal set, when reaching the second communication node, has a performance higher than a predetermined value;
a reference signal in the first reference signal set is a reference signal sent by the first communication node to the second communication node; or
the first reference signal set is a predetermined reference signal set.

In the embodiment of the present disclosure, the method further includes steps described below.

The second communication node sends second signaling information to the first communication node, where the second signaling information carries at least one of pieces of the following indication information:
whether the first communication node needs to receive the channel state information;
whether the first communication node needs to receive channel state information corresponding to the reference signal; or
whether a reference signal sent by the first communication node has corresponding channel state information to be received.

Embodiment Five

An embodiment of the present disclosure provides a method for determining a frequency domain resource, including steps described below.

A resource occupiable by a channel or signal is determined by at least one of:
a frequency domain resource included in a bandwidth part is determined according to a time domain resource;
an available BWP set is determined according to the time domain resource; or
a frequency domain resource occupiable by the channel or signal in one BWP is determined according to the time domain resource.

In the embodiment of the present disclosure, optionally, the method further includes at least one of:
first signaling information is received, and the frequency domain resource occupiable by the channel or signal is determined according to the first signaling information; or
a channel or a signal is received on a frequency domain resource occupied by the channel or signal.

In the embodiment of the present disclosure, optionally, the first signaling information satisfies at least one of the following conditions:
a BWP set corresponding to a BWP index indicated in the first signaling information is determined according to time domain resource information;
a mapping relationship between a BWP and the BWP index indicated in the first signaling information is determined according to a time domain information resource;
a number of bit corresponding to an indication domain of the BWP index indicated in the first signaling information is determined according to the time domain information resource;
a PRB set corresponding to a PRB index indicated in the first signaling information is determined according to the time domain resource information;
a mapping relationship between a PRB resource and the PRB index indicated in the first signaling information is determined according to the time domain information resource;
a number of bit corresponding to an indication domain for indicating the PRB index in the first signaling information is determined according to the time domain information resource; or
a range of a PRB index capable of being indicated in the first signaling information is determined according to the time domain information resource.

In the embodiment of the present disclosure, the method further includes steps described below.

According to second signaling information and/or an agreed rule, at least one of the following corresponding relationships is determined:
a corresponding relationship between N time domain resource sets and N PRB sets in one BWP;
a corresponding relation between N time domain resource sets and N available BWP sets; or
a corresponding relationship between N time domain resource sets and N PRB sets available in one BWP, where n is a positive integer.

In the embodiment of the present disclosure, optionally, the time domain resource includes at least one of:
a time domain resource where a control channel for scheduling the channel or signal is located; or
a time domain resource where the channel or signal is located.

Embodiment Six

An embodiment of the present disclosure provides a method for transmitting a channel or a signal, the method includes steps described below.

A multiplexing manner set usable by two channels or signals is determined; and the two channels or signals are transmitted by one multiplexing manner in the multiplexing manner set.

A multiplexing manner set usable between a first channel or signal and a second channel or signal is a subset of a multiplexing manner set usable between a third channel or signal and a fourth channel or signal.

The first channel or signal and the third channel or signal are channels or signals between a first communication node and a second communication node, and the second channel or signal and the fourth channel or signal are channels or signals between the first communication node and one or more third communication nodes.

In the embodiment of the present disclosure, optionally, the channel or signal satisfies at least one of the following conditions:

the first channel includes at least one of the following channels: a control channel, a channel carrying a broadcast message, a channel carrying a common message, or a channel carrying a group message;

the second channel includes at least one of the following channels: a control channel, a channel carrying a broadcast message, a channel carrying a common message, or a channel carrying a group message;

the third channel do not include at least one of the following channels: a control channel, a channel carrying a broadcast message, a channel carrying a common message, or a channel carrying a group message;

the fourth channel do not include at least one of the following channels: a control channel, a channel carrying a broadcast message, a channel carrying a common message, or a channel carrying a group message;

the third channel is a channel other than the first channel;

the fourth channel is a channel other than the second channel;

the first signal includes at least one of the following signals: a demodulation reference signal, a phase tracking signal, and a synchronization signal;

the second signal includes at least one of the following signals: a demodulation reference signal, a phase tracking signal, and a synchronization signal;

the third signal is a signal other than the first signal; or the fourth signal is a signal other than the second signal.

In the embodiment of the present disclosure, optionally, the multiplexing manner set useable between the first channel or signal and the second channel or signal does not include a spatial division multiplexing manner, and the multiplexing manner set useable between the third channel or signal and the fourth channel or signal includes the spatial division multiplexing manner.

Embodiment Seven

Figure 9:
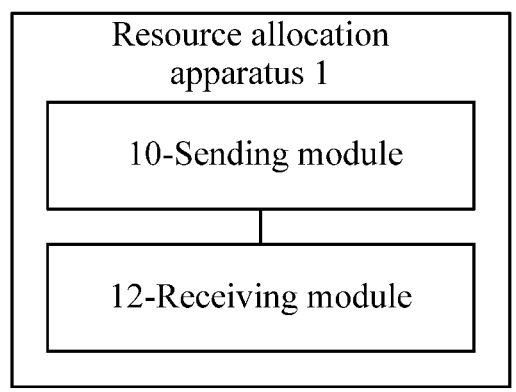
FIG. 9 is a structural diagram of a resource allocation apparatus according to embodiment seven of the present disclosure.

The embodiment of the present disclosure provides a resource allocation apparatus, as show in FIG. 9. The apparatus includes a sending module 10 and/or a receiving module 12.

The sending module 10 is configured to send resource request information to a second communication node, where the resource request information includes first information; and/or the receiving module 12 is configured to receive first resource allocation information sent by the second communication node, where the first resource allocation information includes second information.

The first information and/or the second information includes information of a resource occupiable by a channel a signal between a first communication node and the second communication node and/or includes information of a resource occupiable by a channel or signal between the first communication node and one or more third communication nodes.

In the embodiment of the present disclosure, optionally, the information of the resource occupiable by the channel or signal between the first communication node and the second communication node includes at least one of pieces of following information:

on the resource, the first communication node is unable to receive a channel and/or a signal sent by the second communication node;

on the resource, the first communication node is unable to send a channel and/or a signal to the second communication node;

outside the resource, the first communication node is able to receive a channel and/or a signal sent by the second communication node; or outside the resource, the first communication node is able to send a channel and/or a signal to the second communication node; and, the information of the resource occupiable by the channel or signal between the first communication node and the one or more third communication nodes comprises at least one of pieces of following information:

on the resource, the first communication node receives a channel and/or a signal sent by the one or more third communication nodes;

on the resource, the first communication node sends a channel and/or a signal to the one or more third communication nodes;

outside the resource, the first communication node is unable to receive a channel and/or a signal sent by the one or more third communication nodes; or outside the resource, the first communication node is unable to send a channel and/or a signal to the one or more third communication nodes.

In the embodiment of the present disclosure, optionally, the information of the resource occupiable by the channel or signal between the first communication node and the second communication node includes at least one of pieces of following information:

on the resource, the first communication node is able to receive a channel and/or a signal sent by the second communication node;

on the resource, the first communication node is able to send a channel and/or a signal to the second communication node;

outside the resource, the first communication node does not receive a channel and/or a signal sent by the second communication node; or outside the resource, the first communication node does not send a channel and/or a signal to the second communication node; and, the information of the resource occupiable by the channel or signal between the first communication node and the one or more third communication nodes comprises at least one of pieces of following information:

on the resource, the first communication node is unable to receive a channel and/or a signal sent by the one or more third communication nodes;

on the resource, the first communication node is unable to send a channel and/or a signal to the one or more third communication nodes;

outside the resource, the first communication node is able to receive a channel and/or a signal sent by the one or more third communication nodes; or on the resource, the first communication node is able to send a channel and/or a signal to the one or more third communication nodes.

In the embodiments of the present disclosure, optionally, the first information and/or the second information further includes at least one of pieces of following information of a demodulation reference signal:

a pattern type of the demodulation reference signal; a number of consecutive time domain symbol groups occupied by the demodulation reference signal; a maximum value of a number of time domain symbols comprised in one consecutive time domain symbol group occupied by the demodulation reference signal; a generation parameter for generating a demodulation reference signal sequence; a position of a starting time domain symbol of the demodulation reference signal; a time domain resource mapping manner of the demodulation reference signal; a number of time domain symbols comprised in one consecutive time domain symbol group occupied by the demodulation reference signal; whether transforming precoding of a channel corresponding to the demodulation reference signal is enabled, port information of the demodulation reference signal; a frequency domain group where a demodulation reference signal port is located; a time domain symbol set occupied by the demodulation reference signal; a number of consecutive time domain symbol groups other than a first consecutive time domain symbol group, occupied by the demodulation reference signal; or a range of time domain symbols occupiable by the demodulation reference signal.

In the embodiments of the present disclosure, optionally, the step in which the resource request information is sent to the second communication node includes steps described below.

The resource request information is sent to the second communication node in an uplink channel or an uplink signal.

The step in which the first resource allocation information sent by the second communication node is received includes steps described below.

The first resource allocation information sent by the second communication node is received in a downlink channel or a downlink signal.

In the embodiments of the present disclosure, optionally, the first information and/or the second information further includes following information:

multiplexing manner information usable between a first channel or signal and a second channel or signal, where the first channel or signal is a channel or signal between the first communication node and the second communication node, and the second channel or signal is a channel or signal between the first communication node and the one or more third communication nodes.

In the embodiment of the present disclosure, optionally, the information of multiplexing manner satisfies at least one of the following conditions:

a multiplexing manner set usable by a first control channel and a second control channel is a subset of a multiplexing manner set usable between a third channel or signal and a fourth channel or signal, where the first control channel is a control channel between the first communication node and the second communication node, and the second control channel is a control channel between the first communication node and the one or more third communication nodes; or multiplexing manner set usable by a first reference signal and a second reference signal is a subset of a multiplexing manner set usable between the third channel or signal and the fourth channel or signal, where the first reference signal is a reference signal between the first communication node and the second communication node, and the second reference signal is a reference signal between the first communication node and the one or more third communication nodes.

The third channel or signal is another channel or signal between the first communication node and the second communication node, the fourth channel or signal is another channel or signal between the first communication node and the one or more third communication nodes, and the another channel or signal is any channel or signal other than the control channel and/or the reference signal.

In the embodiments of the present disclosure, optionally, multiplexing manner set usable by the first control channel and the second control channel is a first multiplexing manner set; the multiplexing manner set usable by the first reference signal and the second reference signal is a second multiplexing manner set; the multiplexing manner set usable by the third channel or the third signal and the fourth channel or the fourth signal is a third multiplexing manner set.

The first multiplexing manner set and/or the second multiplexing manner set does not include a spatial division multiplexing manner, and the third multiplexing manner set includes a spatial division multiplexing manner.

In the embodiment of the present disclosure, optionally, the apparatus further includes a communication module.

The sending module 10 is further configured to send second resource allocation information to the one or more third communication nodes, where the second resource allocation information is used for indicating the information of the resource occupiable by the channel or signal between the first communication node and the one or more third communication nodes.

The communication module is configured to: communicate with the second communication node according to the first resource allocation information and/or the resource request information; and/or communicate with the one or more third communication nodes according to the first resource allocation information and/or the resource request information.

In the embodiments of the present disclosure, optionally, the second resource allocation information satisfies at least one of the following conditions:

the second resource allocation information includes information of a control channel resource where a control channel sent by the first communication node and to be detected by the one or more third communication nodes is located, and an intersection between the control channel resource and a first resource is non-empty;

the second resource allocation information includes information of a data channel resource occupiable by a semi-persistent data channel that is sent by the first communication node to the one or more third communication nodes, and an intersection between the data channel resource and the first resource is non-empty;

an intersection between a resource indicated in the second resource allocation information and the first resource is non-empty;

the second resource allocation information includes physical layer dynamic allocation information, and the first resource allocation information includes high layer signaling information;

an intersection between the resource indicated in the second resource allocation information and a second resource is empty, and the second resource is a resource occupied by a reference signal between a first communication node and a second communication node included in the second information;

an intersection between the resource indicated in the second resource allocation information and a third resource is empty, and the third resource is a resource occupied by a control channel resource between the first communication node and the second communication node comprised in the second information; or the first communication node communicates with the one or more third communication nodes according to the second resource allocation information and/or the first resource allocation information and/or the resource request information.

The first resource is a resource indicated by the information of the resource occupiable by the channel or signal between the first communication node and the second communication node, where the information of the resource is included in the second information.

In the embodiments of the present disclosure, optionally, the first resource allocation information satisfies at least one of the following conditions:

the first resource allocation information includes a time domain resource list occupiable by the channel, and all time domain resources included in the time domain resource list have a same time domain resource mapping manner;

the first resource allocation information includes a time domain resource list occupiable by the channel, and a number of time domain symbols corresponding to all time domain resources comprised in the time domain resource list belongs to one predetermined set of numbers of time domain symbols;

the first resource allocation information includes a time domain resource list occupiable by the channel, and the time domain symbols of demodulation reference signals corresponding to all time domain resources included in the time domain resource list satisfy an agreed condition;

the first resource allocation information is included in high layer signaling information;

an intersection between a resource included in the first resource allocation information and a time-frequency resource occupied by the control channel resource is empty, where control channel resource is included in the resource request information;

an intersection between a resource included in the first resource allocation information and a resource occupied by the control channel resource is empty, where the control channel resource is included in the resource request information; or an intersection between a time domain resource occupiable by the first channel or signal included in the first resource allocation information and a time domain resource occupiable by the second channel or signal included in the first resource allocation information is non-empty, where the first channel or signal is a channel or signal sent by the first communication node to the second communication node, and/or the first channel or signal is followed by a third channel or signal, and the second channel or signal is a channel or signal sent by the first communication node to the one or more third communication nodes, and the third channel or signal is a channel or signal received by the first communication node.

In the embodiments of the present disclosure, optionally, the one predetermined set of numbers of time domain symbols satisfies at least one of the following conditions:

the one predetermined set of numbers of time domain symbols is obtained according to an agreed rule;

time domain symbol positions of demodulation reference signals corresponding to all numbers of time domain symbols in the set of numbers of time domain symbols are the same, the time domain symbol positions are obtained according to high layer signaling configuration information of the demodulation reference signals;

the one predetermined set of numbers of time domain symbols is one of a plurality of predetermined sets of numbers of time domain symbols;

the one predetermined set of numbers of time domain symbols is one of a plurality of predetermined sets of numbers of time domain symbols, and the plurality of predetermined sets of numbers of time domain symbols are obtained according to high layer configuration information of the demodulation reference signals; or the one predetermined set of numbers of time domain symbols is one of a plurality of predetermined sets of numbers of time domain symbols, and the plurality of predetermined sets of numbers of time domain symbols are obtained according to a first parameter of the demodulation reference signal, and the first parameter comprises at least one of the following parameters: a time domain resource mapping manner, a number of consecutive time domain symbol groups other than a first consecutive time domain symbol group occupied by the demodulation reference signal, or a number of time domain symbols comprised in the consecutive time domain symbol groups occupied by the demodulation reference signal.

In the embodiments of the present disclosure, optionally, the receiving module 12 is further configured to obtain the second information according to an agreed rule, and the agreed rule satisfies at least one of the following conditions:

a demodulation reference signal between the first communication node and the second communication node and a demodulation reference signal between the first communication node and the one or more third communication nodes are only able to in different demodulation reference signal code division multiplexing groups;

a time domain resource mapping manner corresponding to the channel are unable to be changed dynamically;

a number of time domain symbols comprised in a consecutive time domain symbol group occupied by a demodulation reference signal is unable to be dynamically changed;

a time domain symbol position occupied by the demodulation reference signal between the first communication node and the second communication node is unable to be dynamically changed; or a low peak-to-average ratio sequence is usable as a downlink reference signal sequence sent by the second communication node to the first communication node.

In the embodiments of the present disclosure, optionally, the channel or signal includes at least one of the following channels or signals:

a channel or signal sent by the first communication node to the one or more third communication nodes, a channel or signal sent by the one or more third communication nodes to the first communication node, a channel or signal sent by the second communication node to the first communication node, or a channel or signal sent by the first communication node to the second communication node, wherein the channel comprises at least one of the following channels: a data channel or a control channel.

In the embodiments of the present disclosure, optionally, the reference signal includes at least one of the following signals: a demodulation reference signal, a phase tracking reference signal, or a measurement reference signal.

In the embodiments of the present disclosure, optionally, the resource includes at least one of the following resources: a reference signal resource, a time domain resource, a frequency domain resource, a spatial domain resource, a code domain resource, or a control channel resource.

In the embodiments of the present disclosure, optionally, information of the time domain resource includes at least one of pieces of following information:
a range of a number of time domain symbols occupiable by the channel or signal in one time unit, a time unit set occupiable by the channel or signal, the number of time domain symbols occupiable by the channel or signal in the time unit, a time domain symbol set occupied by the channel or signal in a time unit, or a subcarrier spacing corresponding to a time domain symbol where the channel or signal is located.

In the embodiments of the present disclosure, optionally, information of the frequency domain resource comprises at least one of pieces of following information:
bandwidth part (BWP) information, component carrier (CC) information, information of a physical resource block (PRB) set in a bandwidth part (BWP), or information of a subcarrier spacing corresponding to the frequency domain resource.

In the embodiments of the present disclosure, optionally, the code domain resource information includes at least one of pieces of following information: generation parameter information of a scrambling sequence of the channel, or sequence generation information of a reference signal.

In the embodiments of the present disclosure, optionally, one spatial domain resource corresponds to one measurement reference signal resource; and/or one spatial domain resource corresponds to one port group of one measurement reference signal resource.

In the embodiments of the present disclosure, optionally, the receiving module is further configured to: receive first signaling information sent by the second communication node, wherein the first signaling information comprises scheduling information of a measurement reference signal; and receive channel state information corresponding to the measurement reference signal sent by the second communication node.

The sending module 10 is further configured to send the measurement reference signal to the second communication node.

In the embodiment of the present disclosure, optionally, the measurement reference signal is an uplink measurement reference signal.

The embodiment of the present disclosure is an apparatus embodiment corresponding to the embodiment one, and has the same technical effects as in the embodiment one.

Embodiment Eight

Figure 10:
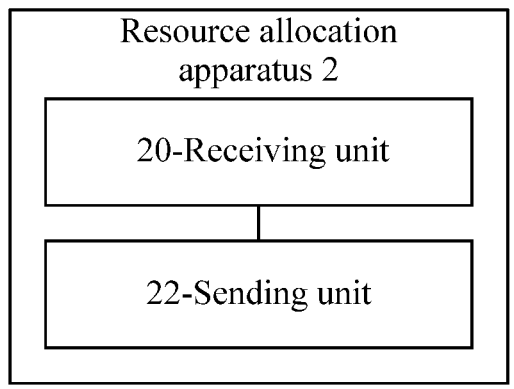
FIG. 10 is a structural diagram of a resource allocation apparatus according to embodiment eight of the present disclosure.

An embodiment of the present disclosure provides a resource allocation apparatus, as show in FIG. 10. The apparatus includes a receiving unit 20 and/or a sending unit 22.

The receiving unit 20 is configured to receive resource request information sent by a first communication node, where the resource request information comprises first information.

The sending unit is configured to send resource allocation information to the first communication node, where the resource allocation information includes second information.

The first information and/or the second information includes information of a resource occupiable by a channel or signal between the first communication node and the second communication node, and/or includes information of a resource occupiable by a channel or signal between the first communication node and one or more third communication nodes.

In the embodiment of the present disclosure, optionally, the information of the resource occupiable by the channel or signal between the first communication node and the second communication node includes at least one of pieces of following information:
on the resource, the first communication node is unable to receive a channel and/or a signal sent by the second communication node;
on the resource, the first communication node is unable to send a channel and/or a signal to the second communication node;
outside the resource, the first communication node is able to receive a channel and/or a signal sent by the second communication node; or
outside the resource, the first communication node is able to send a channel and/or a signal to the second communication node; and,
the information of the resource occupiable by the channel or signal between the first communication node and the one or more third communication nodes includes at least one of pieces of following information:
on the resource, the first communication node receives a channel and/or a signal sent by the one or more third communication nodes;
on the resource, the first communication node sends a channel and/or a signal to the at least one third communication node;
outside the resource, the first communication node is unable to receive a channel and/or a signal sent by the one or more third communication nodes; or
outside the resource, the first communication node is unable to send a channel and/or a signal to the one or more third communication nodes.

In the embodiment of the present disclosure, optionally, the information of the resource occupiable by the channel or signal between the first communication node and the second communication node includes at least one of pieces of following information:
on the resource, the first communication node is able to receive a channel and/or a signal sent by the second communication node;
on the resource, the first communication node is able to send a channel and/or a signal to the second communication node;
outside the resource, the first communication node does not receive a channel and/or a signal sent by the second communication node; or
outside the resource, the first communication node does not send a channel and/or a signal to the second communication node; and
the information of the resource occupiable by the channel or signal between the first communication node and the one or more third communication nodes includes at least one of pieces of following information:
on the resource, the first communication node is unable to receive a channel and/or a signal sent by the one or more third communication nodes;

on the resource, the first communication node is unable to send a channel and/or a signal to the one or more third communication nodes;
outside the resource, the first communication node is able to receive a channel and/or a signal sent by the one or more third communication nodes; or
outside the resource, the first communication node is able to send a channel and/or a signal to the one or more third communication nodes.

In the embodiments of the present disclosure, optionally, the first information and/or the second information further includes at least one of pieces of following information of a demodulation reference signal:
a pattern type of the demodulation reference signal; a number of consecutive time domain symbol groups occupied by the demodulation reference signal; a maximum value of a number of time domain symbols comprised in one consecutive time domain symbol group occupied by the demodulation reference signal; a generation parameter for generating a demodulation reference signal sequence; a position of a starting time domain symbol of the demodulation reference signal; a time domain resource mapping manner of a data channel corresponding to the demodulation reference signal; a number of time domain symbols comprised in one consecutive time domain symbol group occupied by the demodulation reference signal; whether transforming precoding of a channel corresponding to the demodulation reference signal is enabled, port information of the demodulation reference signal; a frequency domain group where a demodulation reference signal port is located; a time domain symbol set occupied by the demodulation reference signal; a number of consecutive time domain symbol groups, other than a first consecutive time domain symbol group, occupied by the demodulation reference signal; or a range of time domain symbols occupiable by the demodulation reference signal.

In the embodiments of the present disclosure, optionally, the step in which the resource request information sent by the first communication node is received includes steps described below.

Resource request indication information sent by the first communication node is received in an uplink channel or an uplink signal; and A step in which the resource allocation information is sent to the first communication node includes a step described below.

The resource allocation information is sent to the first communication node in a downlink channel or a downlink signal.

In the embodiments of the present disclosure, optionally, the first information and/or the second information further includes following information:
multiplexing manner information usable between a first channel or signal and a second channel or signal, where the first channel or signal is a channel or signal between the first communication node and the second communication node, and the second channel or signal is a channel or signal between the first communication node and the one or more third communication nodes.

In the embodiment of the present disclosure, optionally, the information of multiplexing manner satisfies at least one of the following conditions:
a multiplexing manner usable by a first control channel and a second control channel is a subset of a multiplexing manner set usable between a third channel or signal and a fourth channel or signal, where the first control channel is a control channel between the first communication node and the second communication node, and the second control channel is a control channel between the first communication node and the one or more third communication nodes; or
a multiplexing manner set usable by a first reference signal and a second reference signal is a subset of a multiplexing manner set usable between the third channel or signal and the fourth channel or signal; the first reference signal is a reference signal between the first communication node and the second communication node, and the second reference signal is a reference signal between the first communication node and the one or more third communication nodes; the third channel or signal is another channel or signal between the first communication node and the second communication node, the fourth channel or signal is another channel or signal between the first communication node and the one or more third communication nodes, and the another channel or signal is any channel or signal other than the control channel and/or the reference signal, In the embodiments of the present disclosure, optionally, multiplexing manner set usable by the first control channel and the second control channel is a first multiplexing manner set; the multiplexing manner set usable by the first reference signal and the second reference signal is a second multiplexing manner set; the multiplexing manner set usable by the third channel or the third signal and the fourth channel or the fourth signal is a third multiplexing manner set.

The first multiplexing manner set and/or the second multiplexing manner set does not include a spatial division multiplexing manner, and the third multiplexing manner set includes a spatial division multiplexing manner.

In the embodiments of the present disclosure, optionally, the first resource allocation information satisfies at least one of the following conditions:
the first resource allocation information includes a time domain resource list occupiable by the channel, and all time domain resources included in the time domain resource list have a same time domain resource mapping manner;
the first resource allocation information includes a time domain resource list occupiable by the channel, and a number of time domain symbols corresponding to all time domain resources included in the time domain resource list belongs to one predetermined set of numbers of time domain symbols;
the first resource allocation information includes a time domain resource list occupiable by the channel, and time domain symbols of demodulation reference signals corresponding to all time domain resources included in the time domain resource list satisfy an agreed condition;
the first resource allocation information is included in high layer signaling information;
an intersection between a resource included in the first resource allocation information and a time-frequency resource occupied by the control channel resource is empty, where control channel resource is included in the resource request information;
an intersection between a resource included in the first resource allocation information and a time-frequency resource occupied by the control channel resource is empty, where control channel resource is included in the resource request information; or
an intersection between a time domain resource occupiable by the first channel or signal and the first resource allocation information included and a time domain resource occupiable by the second channel or signal included in the first resource allocation information is non-empty, where the first channel or signal is a channel or signal sent by the first communication node to the second communication node, and/or the first channel or signal is followed by a third channel or signal, and the second channel or signal is a channel or signal sent by the first communication node to the one or more third communication nodes, and the third channel or signal is a channel or signal received by the first communication node.

In the embodiments of the present disclosure, optionally, the one predetermined set of numbers of time domain symbols satisfies at least one of the following conditions:
the one predetermined set of numbers of time domain symbols is obtained according to an agreed rule;
time domain symbol positions of demodulation reference signals corresponding to all numbers of time domain symbols in the set of numbers of time domain symbols are the same, the time domain symbol positions are obtained according to high layer signaling configuration information of the demodulation reference signals;
the one predetermined set of numbers of time domain symbols is one of a plurality of predetermined sets of numbers of time domain symbols;
the one predetermined set of numbers of time domain symbols is one of a plurality of predetermined sets of numbers of time domain symbols, and the plurality of predetermined sets of numbers of time domain symbols are obtained according to high layer configuration information of the demodulation reference signals; or
the one predetermined set of numbers of time domain symbols is one of a plurality of predetermined sets of numbers of time domain symbols, and the plurality of predetermined sets of numbers of time domain symbols are obtained according to a first parameter of the demodulation reference signal, and the first parameter includes at least one of the following parameters: a time domain resource mapping manner, a number of consecutive time domain symbol groups other than a first consecutive time domain symbol group occupied by the demodulation reference signal, or a number of time domain symbols included in the consecutive time domain symbol groups occupied by the demodulation reference signal.

In the embodiments of the present disclosure, optionally, the channel or signal includes at least one of the following channels or signals:
a channel or signal sent by the first communication node to the one or more third communication nodes, a channel or signal sent by the one or more third communication nodes to the first communication node, a channel or signal sent by the second communication node to the first communication node, or a channel or signal sent by the first communication node to the second communication node, where the channel is a data channel and/or a control channel.

In the embodiments of the present disclosure, optionally, the reference signal includes at least one of the following signals: a demodulation reference signal, a phase tracking reference signal, or a measurement reference signal.

In the embodiments of the present disclosure, optionally, the resource includes at least one of the following resources: a reference signal resource, a time domain resource, a frequency domain resource, a spatial domain resource, a code domain resource, or a control channel resource.

In the embodiments of the present disclosure, optionally, information of the time domain resource includes at least one of pieces of following information:
a range of a number of time domain symbols occupiable by the channel or signal in one time unit, a time unit set occupiable by the channel or signal, the number of time domain symbols occupiable by the channel or signal in a time unit, a time domain symbol set occupied by the channel or signal in a time unit, or a subcarrier spacing corresponding to a time domain symbol where the channel or signal is located.

In the embodiments of the present disclosure, optionally, information of the frequency domain resource includes at least one of pieces of following information:
bandwidth part (BWP) information, component carrier (CC) information, information of a physical resource block (PRB) set in a bandwidth part (BWP), or information of a subcarrier spacing corresponding to the frequency domain resource.

In the embodiments of the present disclosure, optionally, the code domain resource information includes at least one of pieces of following information: generation parameter information of a scrambling sequence of the channel, or sequence generation information of a reference signal.

In the embodiments of the present disclosure, optionally, one spatial domain resource corresponds to one measurement reference signal resource; and/or one spatial domain resource corresponds to one port group of one measurement reference signal resource.

In the embodiments of the present disclosure, optionally, the receiving unit 20 is further configured to: receive first signaling information sent by the second communication node, wherein the first signaling information comprises scheduling information of a measurement reference signal; and receive channel state information corresponding to the measurement reference signal sent by the second communication node.

The sending unit is further configured to send the measurement reference signal to the second communication node.

In the embodiment of the present disclosure, optionally, the reference signal is an uplink reference signal.

The embodiment of the present disclosure is an apparatus embodiment corresponding to the embodiment two, and has the same technical effects in the embodiment two.

Embodiment Nine

Figure 11:
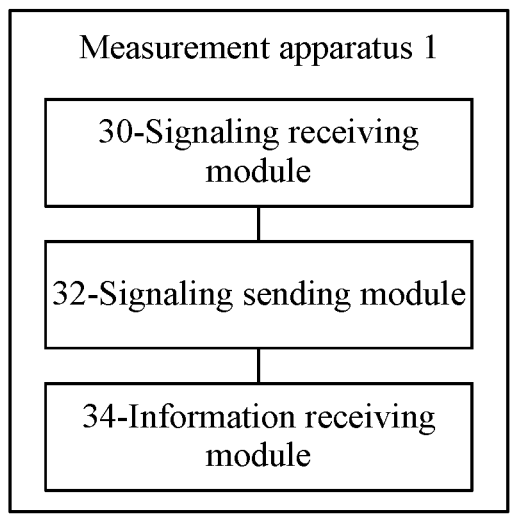
FIG. 11 is a structural diagram of a measurement apparatus according to embodiment nine of the present disclosure.

The embodiment of the present disclosure provides a measurement apparatus, as show in FIG. 11. The apparatus includes a signaling receiving module 30, a signaling sending module 32, and an information receiving module 34.

The signaling receiving module 30 is configured to receive first signaling information sent by a second communication node, where the first signaling information comprises scheduling information of a measurement reference signal.

The signaling sending module 32 is configured to send a measurement reference signal to the second communication node.

The information receiving module 34 is configured to receive channel state information corresponding to the measurement reference signal, where the channel state information is sent by the second communication node.

In the embodiment of the present disclosure, optionally, the measurement reference signal is an uplink measurement reference signal.

In the embodiment of the present disclosure, optionally, the step in which the channel state information corresponding to the measurement reference signal sent by the second communication node is received includes a step described below.

The channel state information corresponding to the measurement reference signal sent by the second communication node is received, in a downlink channel, and/or in a downlink signal, and/or in a periodic downlink channel, and/or in a periodic downlink signal.

In the embodiment of the present disclosure, optionally, the channel state information includes reference signal resource indication information and/or reference signal quality indication information.

In the embodiment of the present disclosure, optionally, the channel state information satisfies at least one of the following conditions:
the channel state information includes indication information of P1 reference signal resources, the P1 reference signal resources correspond to P1 reference signal resources with the lowest signal quality among P reference signal resources sent by the first communication node, and P1 is an integer;
the channel state information includes indication information of P2 reference signal resources, receiving filter parameters corresponding to the P2 reference signal resources are different from receiving filter parameters corresponding to reference signals in a first reference signal set, and P2 is an integer; or
the channel state information includes indication information of P2 reference signal resource, and the P2 reference signal resources and reference signals in a first reference signal set do not satisfy a quasi-co-location relationship with respect to spatial receiving filtering parameters.

In the embodiment, optionally, the first reference signal set satisfies at least one of the following conditions:
the first reference signal set includes measurement reference signals included in an uplink SRS set which is configured to the first communication node by the second communication node and is used for non-codebook transmission;
the first reference signal set includes an SRS included in an uplink SRS set which is configured to the first communication node by the second communication node and is used for codebook transmission;
the first reference signal set includes an SRS included in a spatial filtering parameter acquisition parameter of a channel sent by the first communication node to the second communication node, where the channel includes a data channel and/or a control channel;
the first reference signal set includes an SRS included in an acquisition parameter of a precoding parameter of a channel sent by the first communication node to the second communication node, where the channel includes a data channel and/or a control channel;
a reference signal in the first reference signal set, when reaching the second communication node, has a performance higher than a predetermined value;
a reference signal in the first reference signal set is a reference signal sent by the first communication node to the second communication node; or
the first reference signal set is a predetermined reference signal set.

In the embodiment of the present disclosure, the apparatus further includes a signaling sending module.

The signaling sending module is configured to send second signaling information to the second communication node, where the second signaling information carries at least one of pieces of the following indication information:
whether the first communication node needs to receive the channel state information;
whether the first communication node needs to receive channel state information corresponding to the reference signal; or
whether a reference signal sent by the first communication node has corresponding channel state information to be received.

The embodiment of the present disclosure is an apparatus embodiment corresponding to the embodiment three, and has the same technical effects as in the embodiment three.

Embodiment Ten

Figure 12:
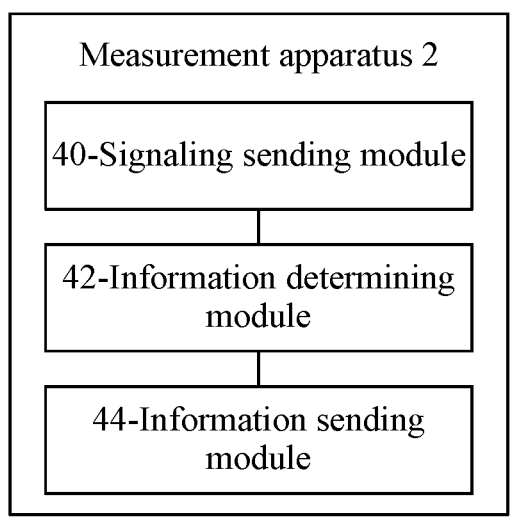
FIG. 12 is a structural diagram of a measurement apparatus according to embodiment ten of the present disclosure.

The embodiment of the present disclosure provides a measurement apparatus, as show in FIG. 12. The apparatus includes a signaling sending module 40, an information determining module 42, and an information sending module 44.

The signaling sending module 40 is configured to send first signaling information, where the first signaling information is used for instructing a first communication node to send a reference signal.

The information determining module is configured to determine a spatial domain resource in resource allocation information and/or channel state information according to the reference signal sent by the first communication node.

The information sending module 44 is configured to send the channel state information to the first communication node.

In the embodiment of the present disclosure, optionally, the reference signal is an uplink reference signal.

In the embodiment of the present disclosure, optionally, the step in which the channel state information is sent to the first communication node includes steps described below.

The channel state information is sent to the first communication node, in a downlink channel, and/or in a downlink signal, and/or in a periodic downlink channel, and/or in a periodic downlink signal.

In the embodiment of the present disclosure, optionally, the channel state information includes reference signal resource indication information and/or reference signal quality indication information.

In the embodiment of the present disclosure, optionally, the channel state information satisfies at least one of the following conditions:
the channel state information includes indication information of P1 reference signal resources, the P1 reference signal resources correspond to P1 reference signal resources with the lowest signal quality among P reference signal resources sent by the first communication node, and P1 is an integer;
the channel state information includes indication information of P2 reference signal resources, receiving filter parameters corresponding to the P2 reference signal resources are different from receiving filter parameters corresponding to reference signals in a first reference signal set, and P2 is an integer; or
the channel state information includes indication information of P2 reference signal resource, and the P2 reference signal resources and reference signals in a first reference signal set do not satisfy a quasi-co-location relationship with respect to spatial receiving filtering parameters.

In the embodiment of the present disclosure, optionally, the first reference signal set satisfies at least one of the following conditions:
the first reference signal set includes measurement reference signals included in an uplink SRS set which is configured to the first communication node by the second communication node and is used for non-codebook transmission;

the first reference signal set includes an SRS included in an uplink SRS set which is configured to the first communication node by the second communication node and is used for codebook transmission;

the first reference signal set includes an SRS included in a spatial filtering parameter acquisition parameter of a channel sent by the first communication node to the second communication node, where the channel includes a data channel and/or a control channel;

the first reference signal set includes an SRS included in an acquisition parameter of a precoding parameter of a channel sent by the first communication node to the second communication node, where the channel includes a data channel and/or a control channel;

a reference signal in the first reference signal set, when reaching the second communication node, has a performance higher than a predetermined value;

a reference signal in the first reference signal set is a reference signal sent by the first communication node to the second communication node; or the first reference signal set is a predetermined reference signal set.

In the embodiment of the present disclosure, the apparatus further includes a signaling sending module.

The signaling sending module is configured to send second signaling information to the first communication node, where the second signaling information carries at least one of pieces of the following indication information:

whether the first communication node needs to receive the channel state information;

whether the first communication node needs to receive channel state information corresponding to the reference signal; or whether a reference signal sent by the first communication node has corresponding channel state information to be received.

The embodiment of the present disclosure is an apparatus embodiment corresponding to the embodiment four, and has the same technical effects as in the embodiment four.

Embodiment Eleven

The embodiment of the present disclosure provides an apparatus for determining a frequency domain resource, including a determining module.

The determining module is configured to determine a resource occupiable by a channel or signal by at least one of:
a frequency domain resource included in a bandwidth part is determined according to a time domain resource;
an available BWP set is determined according to the time domain resource; or
a frequency domain resource occupiable by the channel or signal in one BWP is determined according to the time domain resource.

In the embodiment of the present disclosure, optionally, the apparatus includes a first receiving module and/or a second receiving module.

The first receiving module is configured to receive first signaling information, and determine the frequency domain resource occupiable by the channel or signal according to the first signaling information.

The second receiving module is configured to receive a channel or a signal on a frequency domain resource occupied by the channel or signal.

In the embodiment of the present disclosure, optionally, the first signaling information satisfies at least one of the following conditions:

a BWP set corresponding to a BWP index indicated in the first signaling information is determined according to time domain resource information;

a mapping relationship between a BWP and the BWP index indicated in the first signaling information is determined according to a time domain information resource;

a number of bit corresponding to an indication domain of the BWP index indicated in the first signaling information is determined according to the time domain information resource;

a PRB set corresponding to a PRB index indicated in the first signaling information is determined according to the time domain resource information;

a mapping relationship between a PRB resource and the PRB index indicated in the first signaling information is determined according to the time domain information resource;

a number of bit corresponding to an indication domain for indicating the PRB index in the first signaling information is determined according to the time domain information resource; or a range of a PRB index capable of being indicated in the first signaling information is determined according to the time domain information resource.

In the embodiment of the present disclosure, optionally, the apparatus further includes a determining module.

The determining module is configured to: according to second signaling information and/or an agreed rule, determine at least one of the following corresponding relationships:

a corresponding relationship between N time domain resource sets and N PRB sets in one BWP;

a corresponding relation between N time domain resource sets and N available BWP sets; or a corresponding relationship between N time domain resource sets and N PRB sets available in one BWP, where n is a positive integer.

In the embodiment of the present disclosure, optionally, the time domain resource includes at least one of:
a time domain resource where a control channel for scheduling the channel or signal is located; or
a time domain resource where the channel or signal is located.

The embodiment of the present disclosure is an apparatus embodiment corresponding to the embodiment five, and has the same technical effects as in the embodiment five.

Embodiment Twelve

An embodiment of the present disclosure provides an apparatus for transmitting a channel or a signal, including a determining unit and a transmission unit.

The determining unit is configured to determine a multiplexing manner set usable by two channels or signals.

The transmission unit is configured to transmit the two channels or signals by one multiplexing manner in the multiplexing manner set.

A multiplexing manner set usable between a first channel or signal and a second channel or signal is a subset of a multiplexing manner set usable between a third channel or signal and a fourth channel or signal.

The first channel or signal and the third channel or signal are channels or signals between a first communication node and a second communication node, and the second channel or signal and the fourth channel or signal are channels or signals between the first communication node and one or more third communication nodes.

In the embodiment of the present disclosure, optionally, the channel or signal satisfies at least one of the following conditions:
the first channel includes at least one of the following channels: a control channel, a channel carrying a broadcast message, a channel carrying a common message, or a channel carrying a group message;
the second channel includes at least one of the following channels: a control channel, a channel carrying a broadcast message, a channel carrying a common message, or a channel carrying a group message;
the third channel do not include at least one of the following channels: a control channel, a channel carrying a broadcast message, a channel carrying a common message, or a channel carrying a group message;
the fourth channel do not include at least one of the following channels: a control channel, a channel carrying a broadcast message, a channel carrying a common message, or a channel carrying a group message;
the third channel is a channel other than the first channel;
the fourth channel is a channel other than the second channel;
the first signal includes at least one of the following signals: a demodulation reference signal, a phase tracking signal, and a synchronization signal;
the second signal comprises at least one of the following signals: a demodulation reference signal, a phase tracking signal, and a synchronization signal;
the third signal is a signal other than the first signal; or
the fourth signal is a signal other than the second signal.

In the embodiment of the present disclosure, optionally, the multiplexing manner set useable between the first channel or signal and the second channel or signal does not include a spatial division multiplexing manner, and the multiplexing manner set useable between the third channel or signal and the fourth channel or signal includes the spatial division multiplexing manner.

The embodiment of the present disclosure is an apparatus embodiment corresponding to the embodiment six, and has the same technical effects as in the embodiment six.

Embodiment Thirteen

The embodiment of the present disclosure provides a resource allocation device, where the device includes a memory and a processor, the memory is configured to store a computer program. The computer program, when executed by the processor, implements steps of the method in the embodiment one.

Embodiment Fourteen

The embodiment of the present disclosure provides a resource allocation device, where the device includes a memory and a processor, the memory is configured to store a computer program. The computer program, when executed by the processor, implements steps of the method in the embodiment two.

Embodiment Fifteen

The embodiment of the present disclosure provides a measurement device, where the device includes a memory and a processor, the memory is configured to store a computer program. The computer program, when executed by the processor, implements steps of the method in the embodiment three.

Embodiment Sixteen

The embodiment of the present disclosure provides a measurement device, where the device includes a memory and a processor, the memory is configured to store a computer program. The computer program, when executed by the processor, implements steps of the method in the embodiment four.

Embodiment Seventeen

The embodiment of the present disclosure provides a device for determining a frequency domain resource, where the device includes a memory and a processor, the memory is configured to store a computer program. The computer program, when executed by the processor, implements steps of the method in the embodiment five.

Embodiment Eighteen

The embodiment of the present disclosure provides a transmission device, where the device includes a memory and a processor, the memory is configured to store a computer program. The computer program, when executed by the processor, implements steps of the method in the embodiment six.

Embodiment Nineteen

The embodiment of the present disclosure provides computer-readable storage medium, where the storage medium stores a first computer program, and/or a second computer program, and/or a third computer program, and/or a fourth computer program, and/or a fifth computer program, and/or a sixth computer program.

The first computer program, when executed by at least one processor, performs steps of the method in embodiment one;
The second computer program, when executed by at least one processor, performs steps of the method in embodiment two;
The third computer program, when executed by at least one processor, performs steps of the method in embodiment three;
The fourth computer program, when executed by at least one processor, performs steps of the method in embodiment four;
The fifth computer program, when executed by at least one processor, performs steps of the method in embodiment five;
The sixth computer program, when executed by at least one processor, performs steps of the method in embodiment six.

The computer-readable storage medium of the embodiment of the present disclosure may be a RAM, a flash memory, a ROM, a EPROM, a EEPROM, a register, a hard disk, a mobile hard disk, a CD-ROM or any other form of storage medium known in the art. A storage medium may be coupled to the processor such that the processor is able to read information from, and write information to, the storage medium; or the storage medium may be a component of the processor The processor and the storage medium may be located in an application specific integrated circuit.

It should be noted that, the methods in embodiment one to embodiment four may be combined with each other. The specific implementations of embodiment one to embodiment nineteen may refer to embodiment one, and corresponding technical effects can be achieved.

The above-described embodiments, alternative details of the present disclosure, and other objects, technical solutions and advantages thereof, should be understood that the above-described embodiments are merely exemplary of the present disclosure, and should not be construed as limiting the scope of the present disclosure, and any modifications, equivalents, improvements, etc. made within the spirit and principle of the present disclosure should be included in the scope of the present disclosure.

What is claimed is:

1. A resource allocation method for a backhaul link and an access link, comprising:
receiving, by a first communication node, first resource allocation information, wherein the first resource allocation information is comprised in high layer signaling information and comprises second information;
wherein the second information comprises information of a fourth resource occupiable by a channel or a signal between the first communication node and one or more third communication nodes; and the second information further comprises indication information which indicates that whether a fifth resource is occupiable by the channel or the signal between the first communication node and the one or more third communication nodes is determined by dynamic signaling; and
wherein the first resource allocation information satisfies that the first resource allocation information comprises a time domain resource list occupiable by the channel, and a number of time domain symbols corresponding to each of time domain resources comprised in the time domain resource list belongs to one predetermined set of numbers of time domain symbols.

2. The method of claim 1, wherein
the information of the fourth resource occupiable by the channel or the signal between the first communication node and the one or more third communication nodes comprises:
on the fourth resource, the first communication node receives at least one of a channel or a signal sent by the one or more third communication nodes; or
on the fourth resource, the first communication node sends at least one of a channel or a signal to the one or more third communication nodes.

3. The method of claim 1, wherein the information of the fourth resource occupiable by the channel or the signal between the first communication node and the one or more third communication nodes comprises:
on the fourth resource, the first communication node is unable to receive at least one of a channel or a signal sent by the one or more third communication nodes; or
on the fourth resource, the first communication node is unable to send at least one of a channel or a signal to the one or more third communication nodes.

4. The method of claim 1, wherein in a case where the information of the fourth resource comprises a demodulation reference signal resource, the second information comprises at least one of pieces of following information of the demodulation reference signal:
a pattern type of the demodulation reference signal; a number of consecutive time domain symbol groups occupied by the demodulation reference signal; a maximum value of a number of time domain symbols comprised in one consecutive time domain symbol group occupied by the demodulation reference signal; a generation parameter for generating a demodulation reference signal sequence; a position of a starting time domain symbol of the demodulation reference signal; a time domain resource mapping manner of the demodulation reference signal; a number of time domain symbols comprised in one consecutive time domain symbol group occupied by the demodulation reference signal; whether transforming precoding of a channel corresponding to the demodulation reference signal is enabled, port information of the demodulation reference signal; a frequency domain group where a demodulation reference signal port is located; a time domain symbol set occupied by the demodulation reference signal; a number of consecutive time domain symbol groups other than a first consecutive time domain symbol group, occupied by the demodulation reference signal; or a range of time domain symbols occupiable by the demodulation reference signal.

5. The method of claim 1, wherein the second information further comprises following information:
multiplexing manner information usable between a first channel or a first signal and a second channel or a second signal; wherein the first channel or the first signal is a channel or a signal between the first communication node and a second communication node, and the second channel or the second signal is a channel or a signal between the first communication node and the one or more third communication nodes.

6. The method of claim 5, wherein the multiplexing manner information satisfies at least one of following conditions:
a multiplexing manner set usable by a first control channel and a second control channel is a subset of a multiplexing manner set usable between a third channel or a third signal and a fourth channel or a fourth signal, wherein the first control channel is a control channel between the first communication node and the second communication node, and the second control channel is a control channel between the first communication node and the one or more third communication nodes; or
a multiplexing manner set usable by a first reference signal and a second reference signal is a subset of a multiplexing manner set usable between the third channel or the third signal and the fourth channel or the fourth signal, wherein the first reference signal is a reference signal between the first communication node and the second communication node, and the second reference signal is a reference signal between the first communication node and the one or more third communication nodes;
wherein the third channel is any channel other than the first control channel between the first communication node and the second communication node, the fourth channel is any channel other than the second control channel between the first communication node and the one or more third communication nodes, the third signal is any signal other than the first reference signal between the first communication node and the second communication node, and the fourth signal is any signal other than the second reference signal between the first communication node and the one or more third communication nodes.

7. The method of claim 1, further comprising at least one of:
sending, by the first communication node, second resource allocation information to the one or more third communication nodes, wherein the second resource allocation information is used for indicating the information of the fourth resource occupiable by the channel or the signal between the first communication node and the one or more third communication nodes; and communicating, by the first communication node, with the one or more third communication nodes according to the first resource allocation information;

wherein the second resource allocation information satisfies at least one of following conditions:

the second resource allocation information comprises information of a control channel resource where a control channel sent by the first communication node and to be detected by the one or more third communication nodes is located, and an intersection between the control channel resource and a first resource is non-empty, wherein the first resource is a resource indicated by information of a resource occupiable by a channel or a signal between the first communication node and a second communication node, wherein the information of the resource is comprised in the second information;

the second resource allocation information comprises information of a data channel resource occupiable by a semi-persistent data channel that is sent by the first communication node to the one or more third communication nodes, and an intersection between the data channel resource and the first resource is non-empty;

an intersection between a resource indicated in the second resource allocation information and the first resource is non-empty;

the second resource allocation information comprises physical layer dynamic allocation information;

an intersection between the resource indicated in the second resource allocation information and a second resource is empty, and the second resource is a resource occupied by a reference signal between the first communication node and the second communication node comprised in the second information;

an intersection between the resource indicated in the second resource allocation information and a third resource is empty, and the third resource is a resource occupied by a control channel resource between the first communication node and the second communication node comprised in the second information; or the first communication node communicates with the one or more third communication nodes according to at least one of the second resource allocation information or the first resource allocation information.

8. The method of claim 1, wherein, when the first resource allocation information comprises the time domain resource list occupiable by the channel and the number of time domain symbols corresponding to all the time domain resources comprised in the time domain resource list belongs to the one predetermined set of numbers of time domain symbols, the one predetermined set of numbers of time domain symbols satisfies at least one of following conditions:

the one predetermined set of numbers of time domain symbols is obtained according to an agreed rule;

time domain symbol positions of demodulation reference signals corresponding to all numbers of time domain symbols in the one predetermined set of numbers of time domain symbols are the same, the time domain symbol positions are obtained according to high layer signaling configuration information of the demodulation reference signals;

the one predetermined set of numbers of time domain symbols is one of a plurality of predetermined sets of numbers of time domain symbols;

the one predetermined set of numbers of time domain symbols is one of the plurality of predetermined sets of numbers of time domain symbols, and the plurality of predetermined sets of numbers of time domain symbols are obtained according to the high layer configuration information of the demodulation reference signals; or the one predetermined set of numbers of time domain symbols is one of the plurality of predetermined sets of numbers of time domain symbols, and the plurality of predetermined sets of numbers of time domain symbols are obtained according to a first parameter of the demodulation reference signal, and the first parameter comprises at least one of following parameters: a time domain resource mapping manner, a number of consecutive time domain symbol groups other than a first consecutive time domain symbol group that are occupied by the demodulation reference signal, or a number of time domain symbols comprised in the consecutive time domain symbol groups occupied by the demodulation reference signal.

9. The method of claim 1, wherein the first communication node further obtains the second information according to an agreed rule, and the agreed rule satisfies at least one of following conditions:

a demodulation reference signal between the first communication node and a second communication node and a demodulation reference signal between the first communication node and the one or more third communication nodes are only able to be in different code division multiplexing groups of demodulation reference signals;

a time domain resource mapping manner corresponding to the channel are unable to be changed dynamically;

a number of time domain symbols comprised in a consecutive time domain symbol group occupied by a demodulation reference signal between the first communication node and the second communication node or a demodulation reference signal between the first communication node and the one or more third communication nodes is unable to be dynamically changed;

a time domain symbol position occupied by the demodulation reference signal between the first communication node and the second communication node is unable to be dynamically changed; or a sequence of low peak-to-average ratios is usable as a downlink reference signal sequence sent by the second communication node to the first communication node.

10. The method of claim 1, wherein the fourth resource comprises at least one of following resources:

a reference signal resource;

a time domain resource;

a frequency domain resource;

a spatial domain resource, wherein the spatial domain resource corresponds to one measurement reference signal resource;

a code domain resource, information of the code domain resource comprises at least one of pieces of following information: generation parameter information of a scrambling sequence of the channel, or sequence generation information of a reference signal, wherein the reference signal comprises at least one of following signals: a demodulation reference signal, a phase tracking reference signal, or a measurement reference signal; or a control channel resource.

11. The method of claim 10, wherein, when the resource comprises the time domain resource, the time domain resource comprises at least one of pieces of following information:
- a range of a number of time domain symbols occupiable by the channel or the signal in one time unit, a time unit set occupiable by the channel or the signal, the number of time domain symbols occupiable by the channel or the signal in a time unit, a time domain symbol set occupied by the channel or the signal in a time unit, or a subcarrier spacing corresponding to a time domain symbol where the channel or the signal is located.

12. The method of claim 10, wherein, when the resource comprises the frequency domain resource, information of the frequency domain resource comprises at least one of pieces of following information:
- bandwidth part (BWP) information, component carrier (CC) information, information of physical resource block (PRB) set in a bandwidth part (BWP), or information of subcarrier spacing corresponding to the frequency domain resource.

13. The method of claim 1, further comprising:
- receiving, by the first communication node, first signaling information sent by a second communication node, wherein the first signaling information comprises scheduling information of a measurement reference signal, wherein the measurement reference signal is an uplink measurement reference signal;
- sending, by the first communication node, the measurement reference signal to the second communication node; and
- receiving, by the first communication node, channel state information corresponding to the measurement reference signal sent by the second communication node.

14. The method of claim 1, further comprising:
- determining a multiplexing manner set usable by two channels or two signals; and
- transmitting the two channels or the two signals by one multiplexing manner in the multiplexing manner set;
wherein a multiplexing manner set usable between a first channel or a first signal and a second channel or a second signal is a subset of a multiplexing manner set usable between a third channel or a third signal and a fourth channel or a fourth signal; and
the first channel or the first channel signal and the third channel or the third signal are channels or signals between a first communication node and a second communication node, and the second channel or the second signal and the fourth channel or the fourth signal are channels or signals between the first communication node and the one or more third communication nodes.

15. The method of claim 14, wherein the channel or the signal satisfies at least one of following conditions:
- the first channel comprises at least one of following channels: a control channel, a channel carrying a broadcast message, a channel carrying a common message, or a channel carrying a group message;
- the second channel comprises at least one of following channels: a control channel, a channel carrying a broadcast message, a channel carrying a common message, or a channel carrying a group message;
- the third channel does not comprise at least one of following channels: a control channel, a channel carrying a broadcast message, a channel carrying a common message, or a channel carrying a group message;
- the fourth channel does not comprise at least one of following channels: a control channel, a channel carrying a broadcast message, a channel carrying a common message, or a channel carrying a group message;
- the third channel is a channel other than the first channel;
- the fourth channel is a channel other than the second channel;
- the first signal comprises at least one of following signals: a demodulation reference signal, a phase tracking signal, and a synchronization signal;
- the second signal comprises at least one of following signals: a demodulation reference signal, a phase tracking signal, and a synchronization signal;
- the third signal is a signal other than the first signal; or
- the fourth signal is a signal other than the second signal.

16. The method of claim 14, wherein
the multiplexing manner set useable between the first channel or the first signal and the second channel or the second signal does not comprise a spatial division multiplexing manner, and the multiplexing manner set useable between the third channel or the third signal and the fourth channel or the fourth signal comprises the spatial division multiplexing manner.

17. A resource allocation apparatus for a backhaul link and an access link, wherein the apparatus comprises a memory and a processor, the memory is configured to store instructions for a computer program, and the computer program, when executed by the processor, to implement a receiving module, wherein
- the receiving module is configured to receive first resource allocation information, wherein the first resource allocation information is comprised in high layer signaling information and comprises second information;
  - wherein the second information comprises information of a fourth resource occupiable by a channel or a signal between the first communication node and one or more third communication nodes; and the second information further comprises indication information which indicates that whether a fifth resource is occupiable by the channel or the signal between the first communication node and the one or more third communication nodes is determined by dynamic signaling; and
  - wherein the first resource allocation information satisfies that the first resource allocation information comprises a time domain resource list occupiable by the channel, and a number of time domain symbols corresponding to each of time domain resources comprised in the time domain resource list belongs to one predetermined set of numbers of time domain symbols.

18. The method of claim 1, further comprising:
sending, by the first communication node, information to a second communication node, wherein the information includes a spatial domain resource of a channel which is sent by the first communication node to the one or more third communication nodes.

19. The method of claim 1, further comprising at least one of:
- determining, by the first communication node, that different time domain resources correspond to different sets of available multiplexing manners or different frequency domain resources correspond to different sets of available multiplexing manners; or determining, by the first communication node, frequency domain resources occupiable by the channel or the signal between the first communication node and the one or more third communication nodes in different time domain resources are different.

\* \* \* \* \*